United States Patent
Tsuchiya et al.

(10) Patent No.: US 9,778,551 B2
(45) Date of Patent: Oct. 3, 2017

(54) ILLUMINATION OPTICAL SYSTEM, OPTICAL ENGINE, AND IMAGE PROJECTION APPARATUS

(71) Applicants: Satoshi Tsuchiya, Kanagawa (JP); Tetsuya Fujioka, Kanagawa (JP); Hideo Kanai, Tokyo (JP); Yasunari Mikutsu, Tokyo (JP); Akihisa Mikawa, Kanagawa (JP); Yukimi Nishi, Tokyo (JP); Jun Mashimo, Tokyo (JP); Takahiro Hiramatsu, Kanagawa (JP); Yoshito Saito, Kanagawa (JP)

(72) Inventors: Satoshi Tsuchiya, Kanagawa (JP); Tetsuya Fujioka, Kanagawa (JP); Hideo Kanai, Tokyo (JP); Yasunari Mikutsu, Tokyo (JP); Akihisa Mikawa, Kanagawa (JP); Yukimi Nishi, Tokyo (JP); Jun Mashimo, Tokyo (JP); Takahiro Hiramatsu, Kanagawa (JP); Yoshito Saito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/186,746

(22) Filed: Jun. 20, 2016

(65) Prior Publication Data
US 2016/0377963 A1 Dec. 29, 2016

(30) Foreign Application Priority Data

Jun. 25, 2015 (JP) .................................. 2015-127329
Apr. 18, 2016 (JP) .................................. 2016-082616

(51) Int. Cl.
*G03B 21/14* (2006.01)
*G02B 27/00* (2006.01)
(Continued)

(52) U.S. Cl.
CPC ......... *G03B 21/147* (2013.01); *G02B 26/008* (2013.01); *G02B 26/0833* (2013.01);
(Continued)

(58) Field of Classification Search
CPC ...... G03B 21/00; G03B 21/14; G03B 21/008; G03B 21/006; G03B 21/147; G03B 21/16; H04N 9/3108; H04N 9/3102; H04N 5/74
(Continued)

(56) References Cited

U.S. PATENT DOCUMENTS 7,529,032 B2   5/2009   Takaura et al.
8,882,277 B2  11/2014   Fujioka et al.
(Continued)

FOREIGN PATENT DOCUMENTS

JP    2004-341029    12/2004
JP    2007-323047    12/2007
(Continued)

*Primary Examiner* — William C Dowling
(74) *Attorney, Agent, or Firm* — IPUSA, PLLC

(57) ABSTRACT

An illumination optical system is provided that is configured to guide light emitted from a light source to an image generation unit that is arranged to be movable in a direction perpendicular to incoming light and is configured to generate an image by reflecting the incoming light. The illumination optical system includes a first lens that is arranged to be movable in a direction perpendicular to an optical axis of the first lens, a second lens that is arranged to be movable in a direction that changes a face-to-face distance between the first lens and the second lens, and a lens position control unit configured to displace the first lens and the second lens.

6 Claims, 20 Drawing Sheets

(51) Int. Cl.
  *G03B 21/00*  (2006.01)
  *G02B 26/00*  (2006.01)
  *G02B 26/08*  (2006.01)

(52) U.S. Cl.
  CPC ....... *G02B 27/0068* (2013.01); *G03B 21/008* (2013.01); *G03B 21/142* (2013.01)

(58) Field of Classification Search
  USPC .................................. 348/771; 353/69, 101
  See application file for complete search history.

(56) References Cited

U.S. PATENT DOCUMENTS

| | | | |
|---|---|---|---|
| 2015/0077725 A1* | 3/2015 | Shibayama | H04N 9/3152 353/99 |
| 2017/0019647 A1* | 1/2017 | Kado | H04N 9/3155 |
| 2017/0026623 A1* | 1/2017 | Nishi | H04N 9/315 |
| 2017/0068152 A1* | 3/2017 | Mikawa | G03B 21/16 |

FOREIGN PATENT DOCUMENTS

| | | |
|---|---|---|
| JP | 4572358 | 11/2010 |
| JP | 2016-085363 | 5/2016 |
| WO | 2016/067519 | 5/2016 |

\* cited by examiner

ILLUMINATION OPTICAL SYSTEM, OPTICAL ENGINE, AND IMAGE PROJECTION APPARATUS

CROSS-REFERENCE TO RELATED APPLICATIONS

The present application claims priority under 35 U.S.C. §119 to Japanese Patent Application No. 2015-127329 filed on Jun. 25, 2015 and Japanese Patent Application No. 2016-082616 filed on Apr. 18, 2016, the entire contents of which are incorporated herein by reference.

BACKGROUND OF THE INVENTION

1. Field of the Invention

The present disclosure relates to an illumination optical system, an optical engine, and an image projection apparatus.

2. Description of the Related Art

Image projection apparatuses are known that are configured to generate an image based on image data received from a personal computer (PC) or a digital camera using light emitted by a light source and pass the generated image through an optical system including a plurality of lenses to project the image on a screen, for example.

Techniques are known that can be implemented in such image projection apparatuses to correct an image projecting position on a screen by shifting a projection lens according to the position of the screen (see, e.g., Japanese Unexamined Patent Publication No. 2004-341029).

Also, an image generation unit for generating a projection image may be displaced in order to correct the position of an image to be projected on a screen or to increase the resolution of the projection image, for example. However, when the image generation unit is displaced, misalignment may occur between the image generation unit and light beams that are emitted from a light source and guided to the image forming unit, and as a result, the image quality of a projection image generated by the image generation unit may become degraded due to partial image loss or a decrease in brightness, for example.

SUMMARY OF THE INVENTION

One aspect of the present invention is directed to a technique for guiding light emitted from a light source according to the position of a displaceable image generation unit and preventing image quality degradation of an image formed by the image generation unit.

According to one embodiment of the present invention, an illumination optical system is provided that is configured to guide light emitted from a light source to an image generation unit that is arranged to be movable in a direction perpendicular to incoming light and is configured to generate an image by reflecting the incoming light. The illumination optical system includes a first lens that is arranged to be movable in a direction perpendicular to an optical axis of the first lens, a second lens that is arranged to be movable in a direction that changes a face-to-face distance between the first lens and the second lens, and a lens position control unit configured to displace the first lens and the second lens.

DESCRIPTION OF THE EMBODIMENTS

Figure 1:
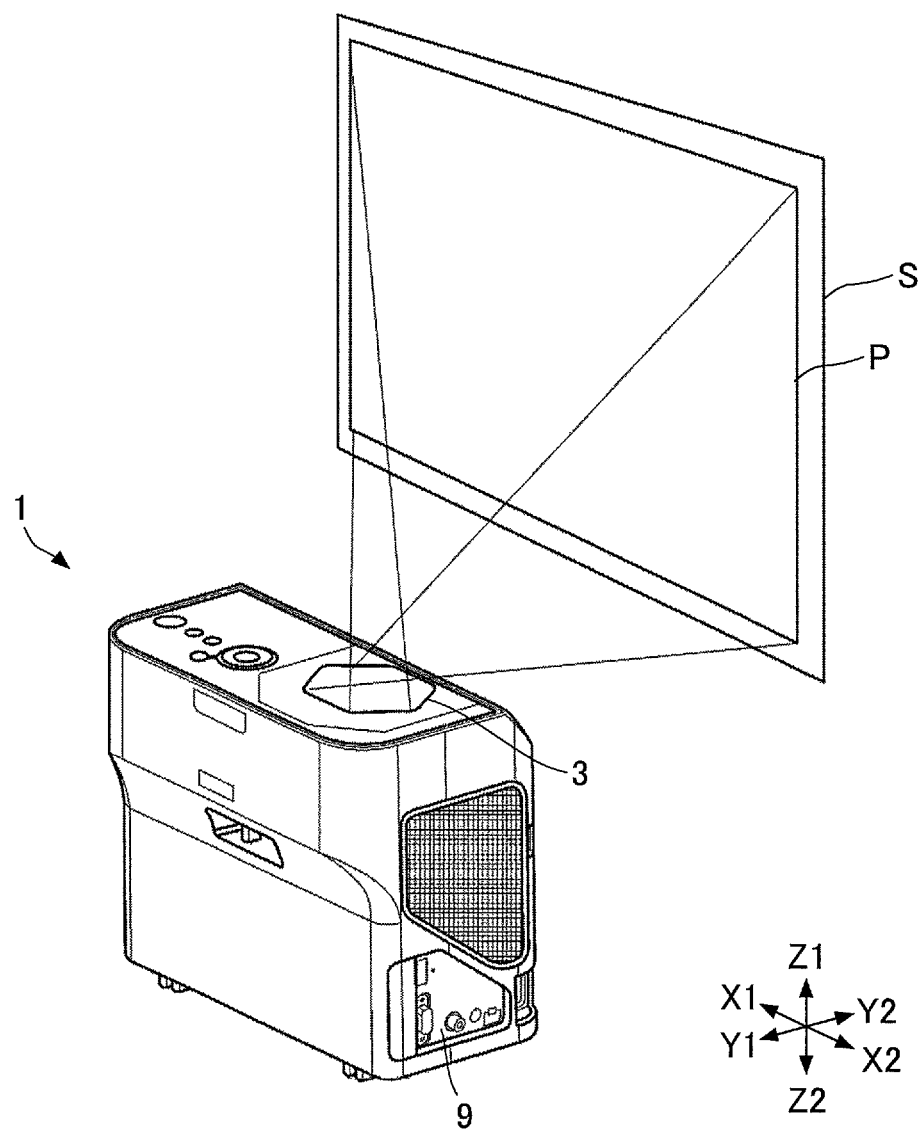
FIG. 1 is a diagram illustrating an image projection apparatus according to an embodiment of the present invention.

In the following, embodiments of the present invention are described with reference to the accompanying drawings. Note that in the drawings, elements having substantially the same features and/or functions are given the same reference numerals and overlapping descriptions may be omitted.

<Image Projection Apparatus Configuration>

FIG. 1 is a diagram illustrating a projector 1 as an example of an image projection apparatus according to an embodiment of the present invention.

In FIG. 1, the projector 1 includes a radiation window 3 and an external interface (I/F) 9. Also, an optical engine for generating a projection image is provided inside the projector 1. For example, when image data is transmitted to the projector 1 from a personal computer (PC) or a digital camera connected to the external interface 9, the optical engine generates an image based on the received image data and projects the image from the radiation window 3 onto a screen S as illustrated in FIG. 1.

Note that in the following drawings, X1-X2 directions represent width directions of the projector 1, Y1-Y2 directions represent depth directions of the projector 1, and Z1-Z2 directions represent height directions of the projector 1. Also, in the following descriptions, it is assumed that the radiation window 3 side of the projector 1 corresponds to the top of the projector 1 and the opposite side of the projector 1 corresponds to the bottom of the projector 1.

Figure 2:
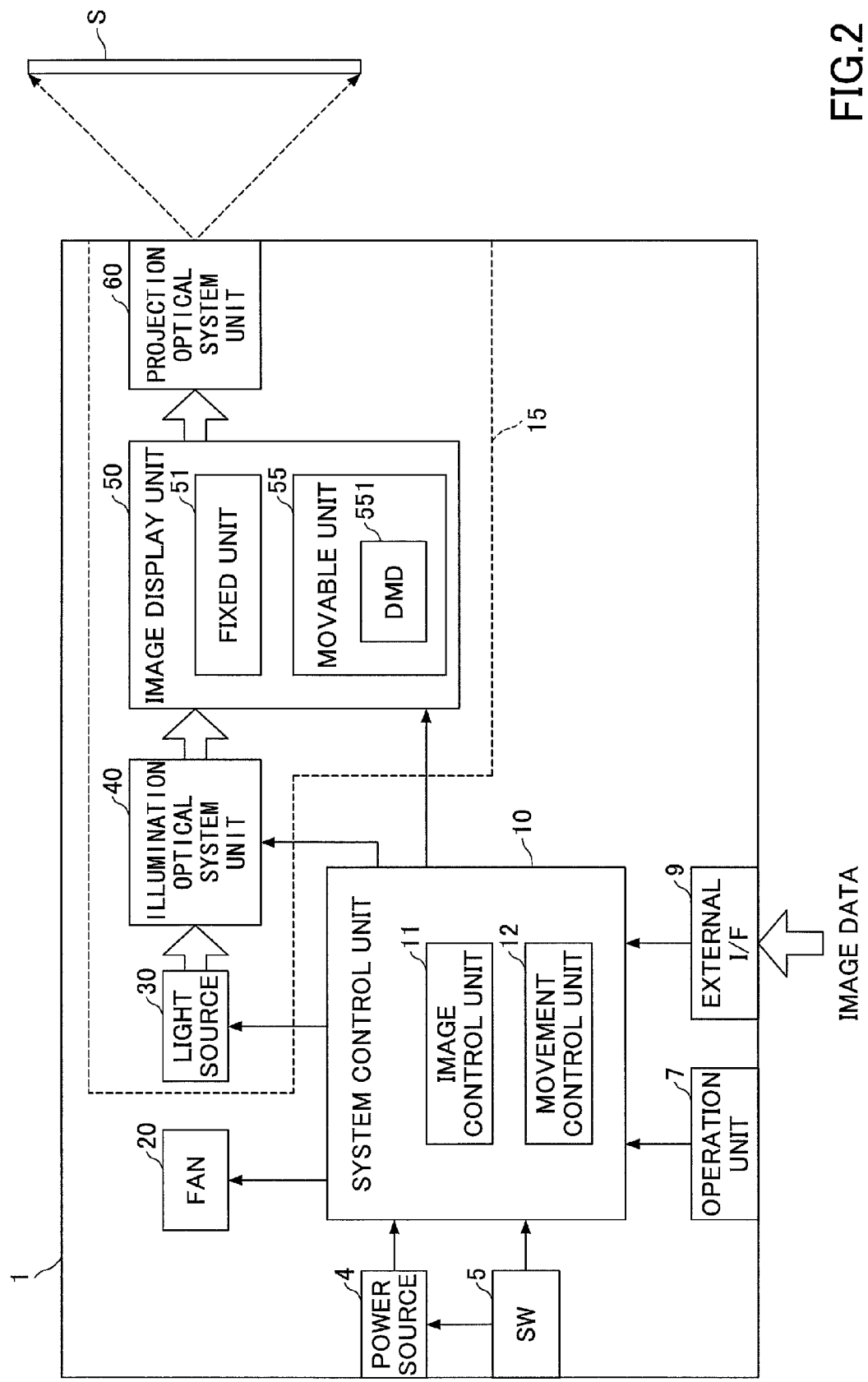
FIG. 2 is a block diagram illustrating a functional configuration of the image projection apparatus according to an embodiment of the present invention.

FIG. 2 is a block diagram illustrating a functional configuration of the projector 1. In FIG. 2, the projector 1 includes a power source 4, a main switch (SW) 5, an operation unit 7, an external interface (I/F) 9, a system control unit 10, a fan 20, and an optical engine 15.

The power source 4 is connected to a commercial power source, converts the voltage and frequency of the commercial power for the internal circuits of the projector 1, and supplies the resulting power to the system control unit 10, the fan 20, and the optical engine 15, for example.

The main switch 5 may be switched ON/OFF by a user to control the power of the projector 1. While the power source 4 is connected to the commercial power source via a power cord, for example, if the main switch 5 is switched ON, the power source 4 starts supplying power to the respective components of the projector 1, and if the main switch 5 is switched OFF, the power source 4 stops supplying power to the respective components of the projector 1.

The operation unit 7 includes buttons configured to receive various input operations by a user. For example, the operation unit 7 may be arranged on a top surface of the projector 1. The operation unit 7 is configured to receive input operations by the user, such as selection of the size of a projection image, selection of a color tone, and adjustment of a focus. The user's input operation received by the operation unit 7 is sent to the system control unit 10.

The external interface 9 includes a connection terminal that is connected to a device, such as a personal computer (PC) or a digital camera, and is configured to supply image data received from the connected device to the system control unit 10.

The system control unit 10 includes an image control unit 11 and a movement control unit 12. For example, the system control unit 10 may include a CPU (a processor), a ROM, and a RAM as hardware components. The functions of the system control unit 10 may be implemented by the CPU loading a program stored in the ROM into the RAM and executing the program, for example.

The image control unit 11 is configured to control a digital micromirror device (DMD) 551 that is included in an image display unit 50 of the optical engine 15 based on the image data received from the external interface 9. In this way, the image control unit 11 may control the DMD 551 to generate an image to be projected on the screen S, for example.

The movement control unit 12 is configured to move a movable unit 55 that is arranged to be movable within the image display unit 50 and control the position of the DMD 551 included in the movable unit 55.

The fan 20 is rotated under the control of the system control unit 10 to cool a light source 30 of the optical engine 15.

The optical engine 15 includes the light source 30, an illumination optical system unit 40, the image display unit 50, and a projection optical system unit 60. The optical engine 15 is controlled by the system control unit 10 to project an image on the screen S.

Examples of the light source 30 include a mercury high-pressure lamp, a xenon lamp, and a light emitting diode (LED). The light source 30 is controlled by the system control unit 10 to emit light to the illumination optical system unit 40.

The illumination optical system unit 40 includes a color wheel, a light tunnel, and relay lenses, for example. The illumination optical system unit 40 is configured to guide the light emitted from the light source 30 to the DMD 551 that is arranged in the image display unit 50.

The image display unit 50 includes a fixed unit 51 that is fixed and supported on the image display unit 50, and the movable unit 55 that is arranged to be movable relative to the fixed unit 51. The movable unit 55 includes the DMD 551. The position of the movable unit 55 relative to the fixed unit 51 is controlled by the movement control unit 12 of the system control unit 10. The DMD 551 is an example of an image generation unit. The DMD 551 is controlled by the image control unit 11 of the system control unit 10. The DMD 551 is configured to modulate incoming light guided by the illumination optical system unit 40 and generate a projection image based on the incoming light.

The projection optical system unit 60 includes a plurality of projection lenses and a mirror, for example. The projection optical system unit 60 is configured to enlarge the image generated by the DMD 551 of the image display unit 50, and project the enlarged image on the screen S.

<Optical Engine Configuration>

Next, a configuration of the optical engine 15 of the projector 1 is described.

Figure 3:
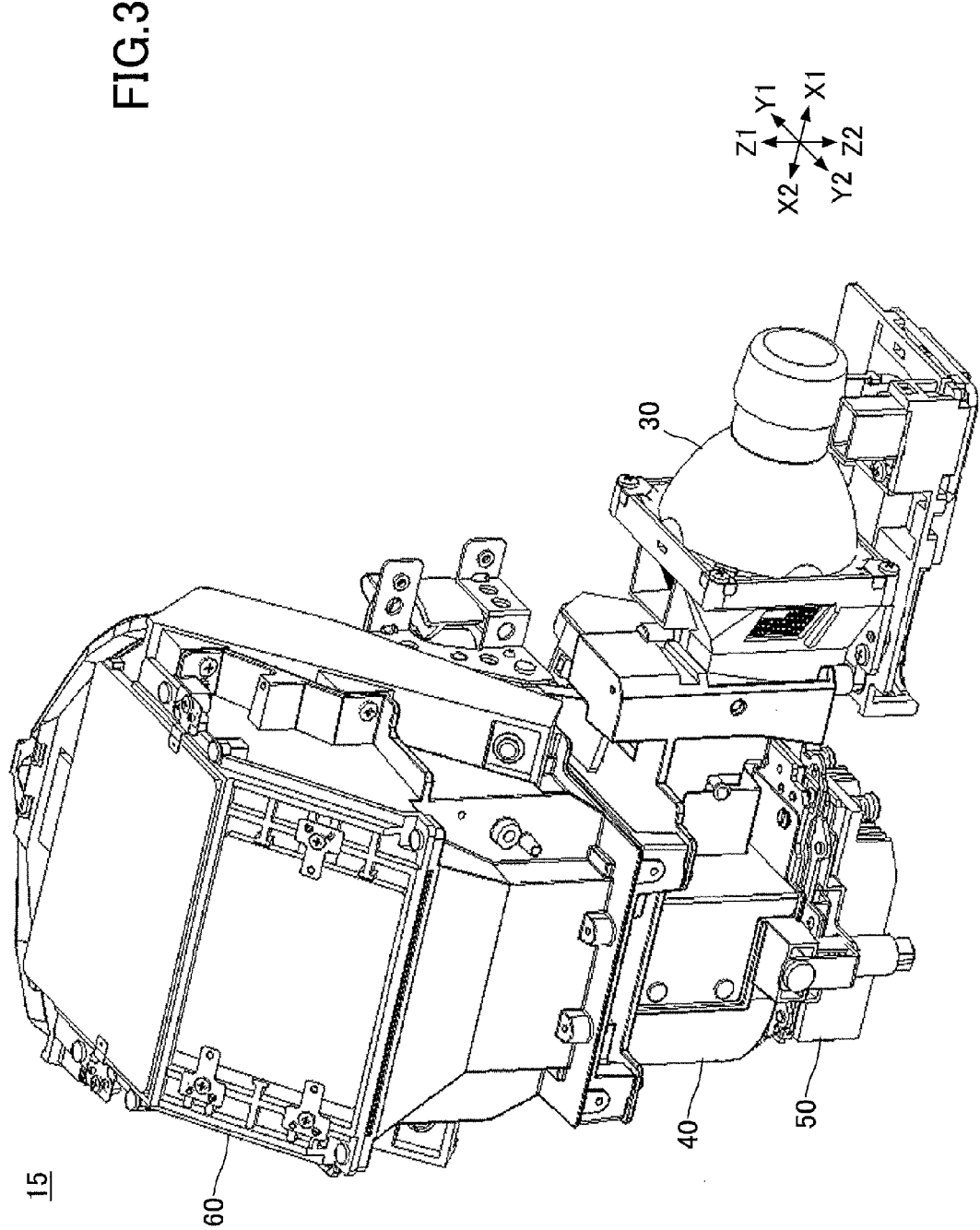
FIG. 3 is a perspective view of an optical engine of the image projection apparatus according to an embodiment of the present invention.

FIG. 3 is a perspective view of the optical engine 15 of the projector 1. In FIG. 3, the optical engine 15 includes the light source 30, the illumination optical system unit 40, the image display unit 50, and the projection optical system unit 60. The optical engine 15 is arranged inside the projector 1.

The light source 30 is provided on a side surface of the illumination optical system unit 40. The light source 30 is configured to emit light in the X2 direction. The illumination optical system unit 40 is configured to guide the light emitted from the light source 30 to the image display unit 50. The image display unit 50 is arranged below the illumination optical system unit 40. The image display unit 50 is configured to generate a projection image based on incoming light guided thereto by the illumination optical system unit 40. The projection optical system unit 60 is provided above the illumination optical system unit 40. The projection image generated by the image display unit 50 is projected outward from the projector 1 by the projection optical system unit 60.

Note that although the optical engine 15 of the above-described embodiment is configured to project an image using light emitted from the light source 30 in an upward direction, in alternative embodiments, the optical engine 15 may be configured to project an image in a horizontal direction, for example.

[Illumination Optical System Unit]

Figure 4:
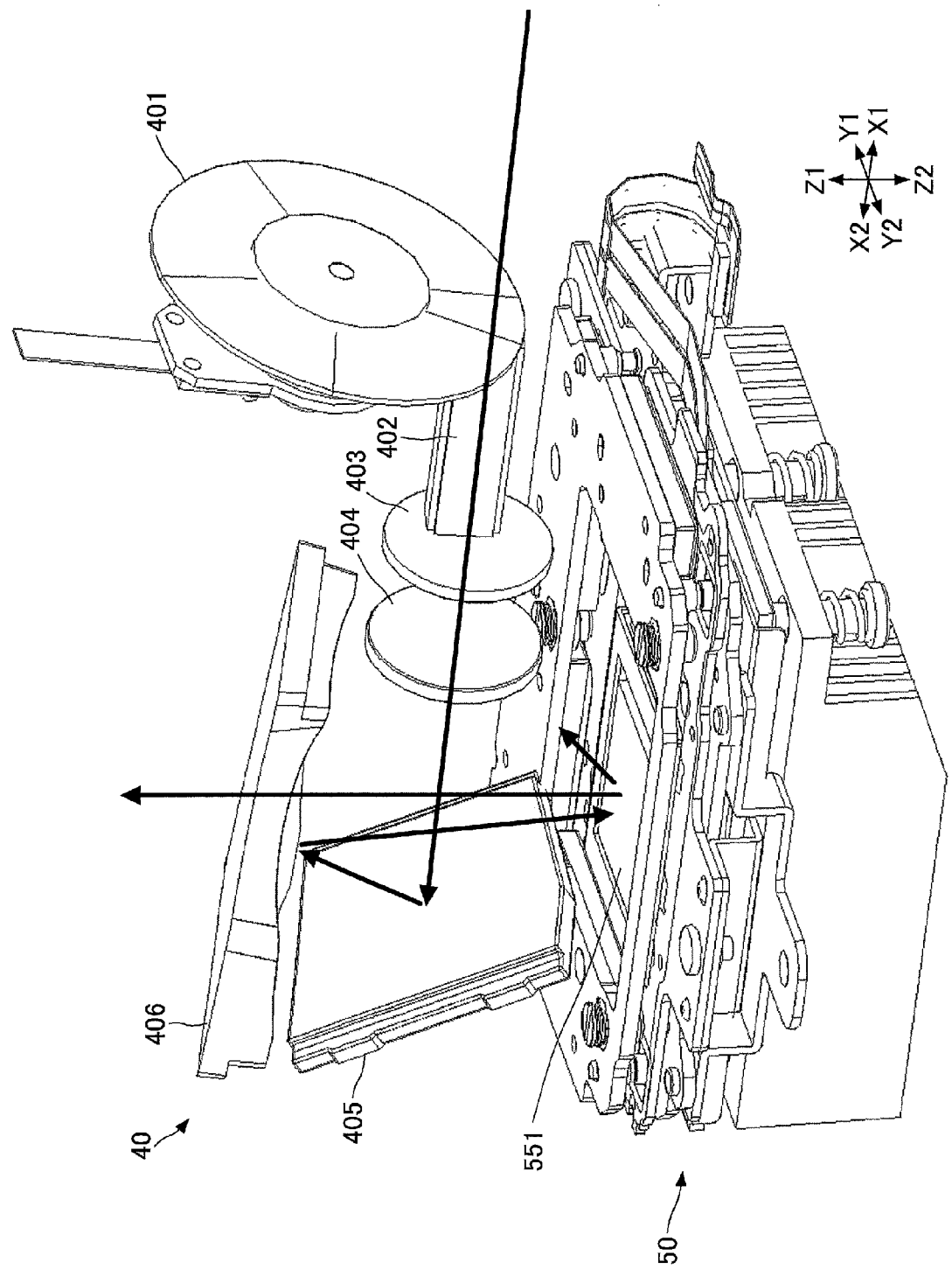
FIG. 4 is a diagram illustrating an illumination optical system unit according to an embodiment of the present invention.

FIG. 4 is a diagram illustrating the illumination optical system unit 40.

In FIG. 4, the illumination optical system unit 40 includes a color wheel 401, a light tunnel 402, relay lenses 403 and 404, a cylindrical mirror 405, and a concave mirror 406.

The color wheel 401 is a disc-like component having different color filters of R (red), G (green), and B (blue) arranged at different portions in the circumferential direction, for example. The color wheel 401 is rotated at high speed so that the light emitted from the light source 30 may be divided into RGB color light beams in a time-division manner.

The light tunnel 402 is a rectangular tube-like component that may be made of bonded glass sheets, for example. The RGB color light beams that have passed through the color wheel 401 are propagated through the light tunnel 402 where they undergo multiple reflections off the inner wall surfaces of the light tunnel 402 so that the light beams may have a uniform luminance distribution, and the resulting light beams are guided to the relay lenses 403 and 404.

The relay lenses 403 and 404 correct on-axis chromatic aberrations of the light beams emitted from the light tunnel 402 and convert the light beams into converging light beams.

The cylindrical mirror 405 and the concave mirror 406 reflect the light from the relay lenses 403 and 404 such that the reflected light is irradiated on the DMD 551 included in the image display unit 50. The DMD 551 is configured to modulate the light reflected by the concave mirror 406 and generate a projection image.

[Projection Optical System Unit]

Figure 5:
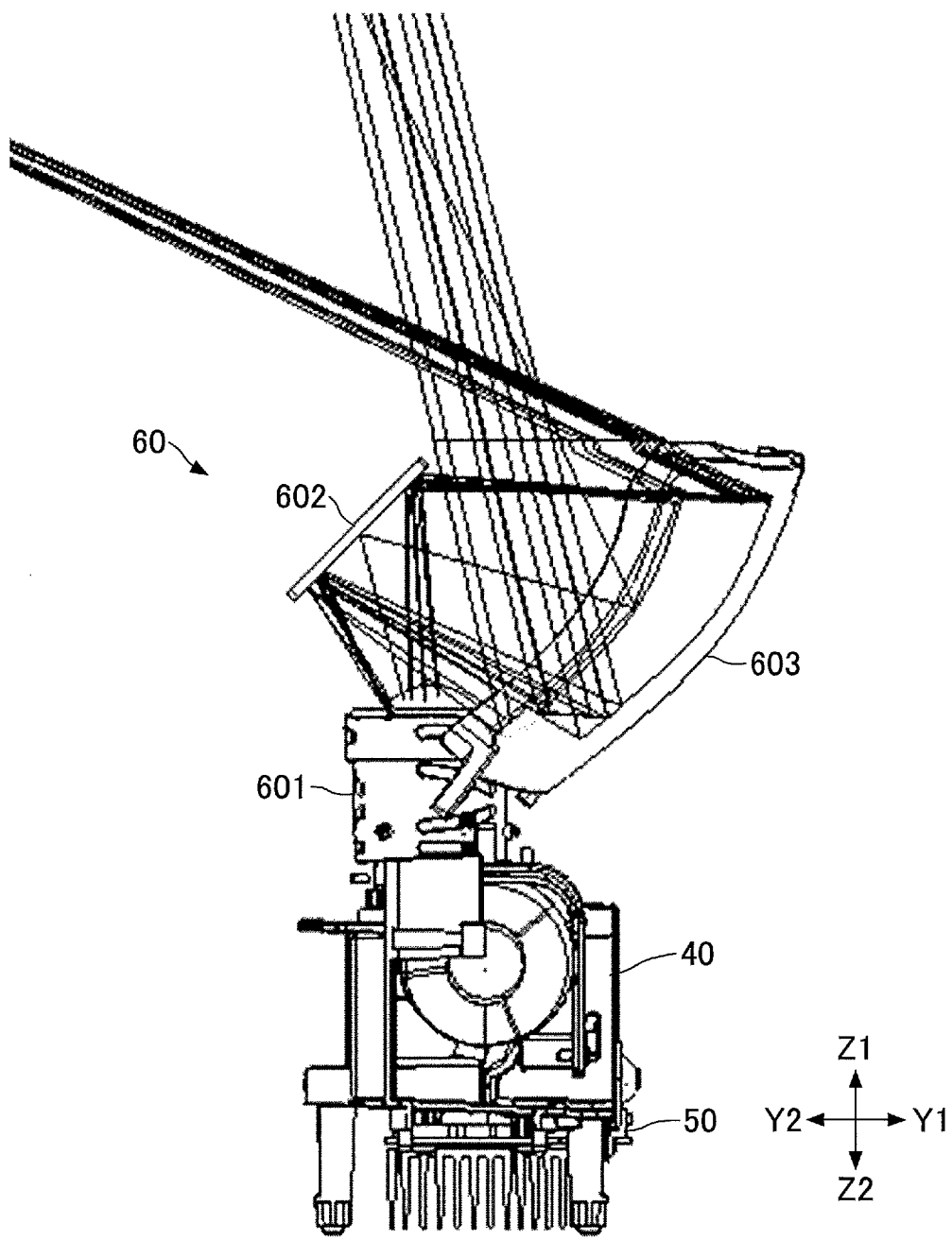
FIG. 5 is a diagram illustrating an internal structure of a projection optical system unit according to an embodiment of the present invention.

FIG. 5 is a diagram illustrating the internal configuration of the projection optical system unit 60.

In FIG. 5, the projection optical system unit 60 includes projection lenses 601, a folding mirror 602, and a curved surface mirror 603 that are accommodated within a housing of the projection optical system unit 60.

The projection lenses 601 include a plurality of lenses that are configured to focus the projection image generated by the DMD 551 of the image display unit 50 onto the folding mirror 602. The folding mirror 602 and the curved surface mirror 603 reflect the focused projection image to enlarge the projection image, and project the resulting image outward onto the screen S, which is provided outside the projector 1, for example.

[Image Display Unit]

Figure 6:
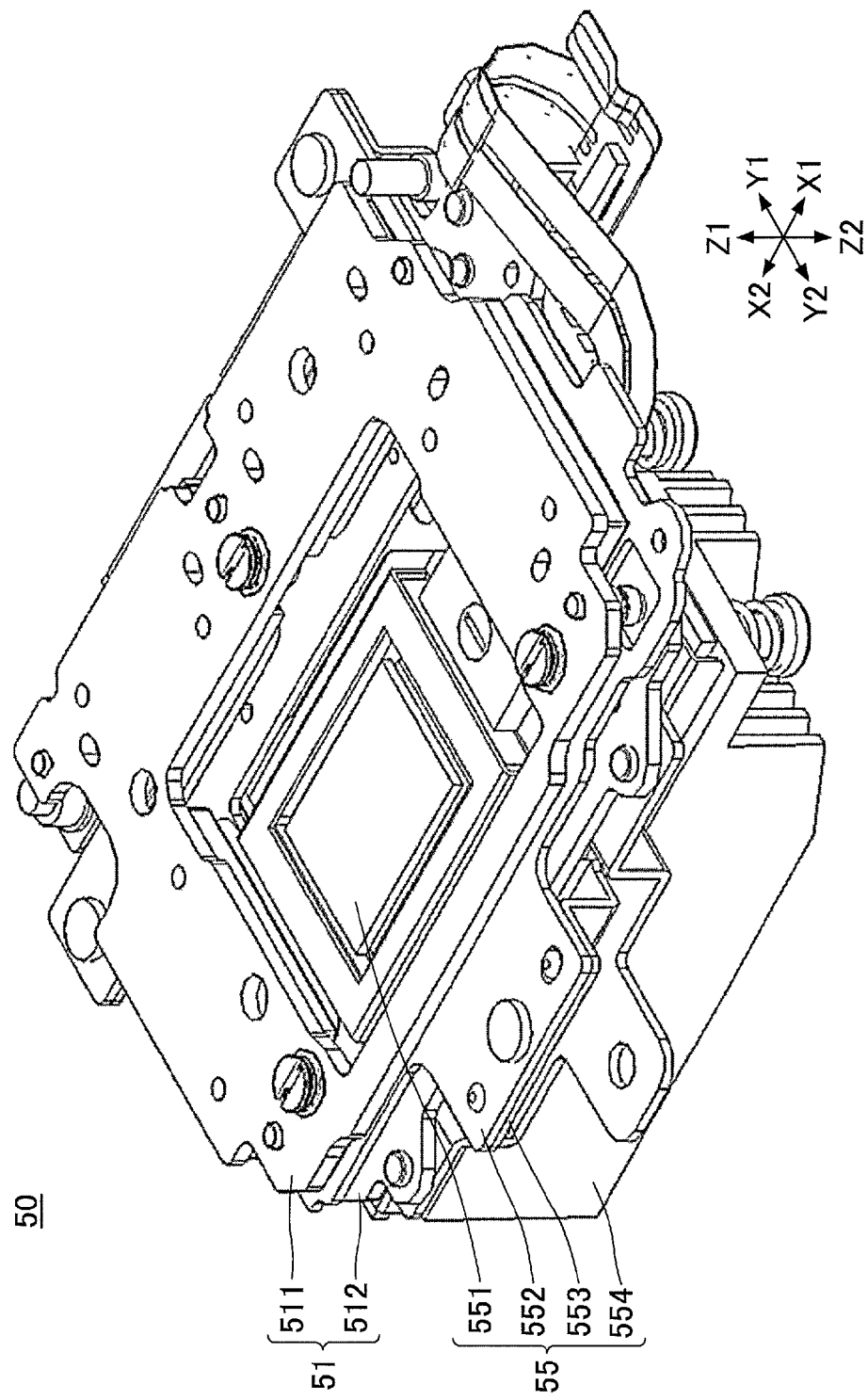
FIG. 6 is a perspective view of an image display unit according to an embodiment of the present invention.
Figure 7:
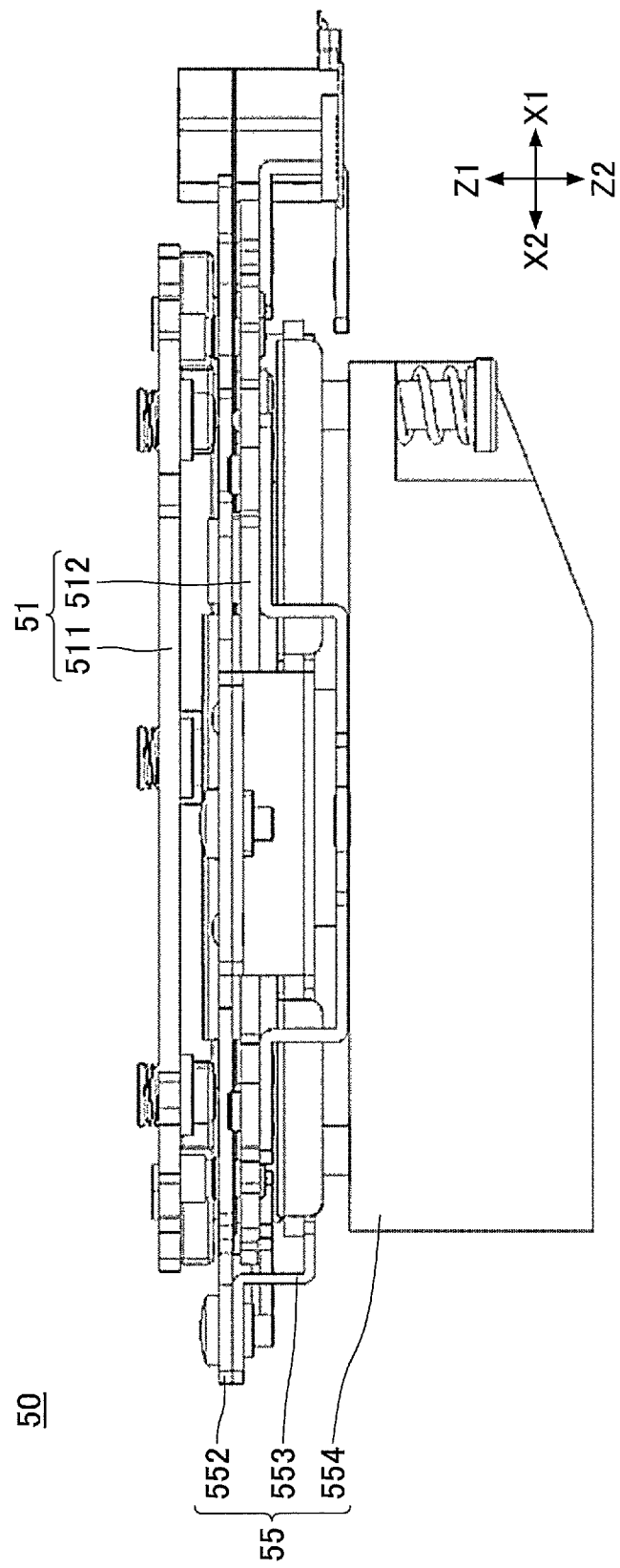
FIG. 7 is a side view of the image display unit.

FIG. 6 is a perspective view of the image display unit 50. FIG. 7 is a side view of the image display unit 50.

As illustrated in FIG. 6 and FIG. 7, the image display unit 50 includes the fixed unit 51 that is fixed in place, and the movable unit 55 that is arranged to be movable with respect to the fixed unit 51.

The fixed unit 51 includes a top plate 511 as a first fixed member, and a base plate 512 as a second fixed member. The top plate 511 and the base plate 512 are spaced apart by a predetermined distance and are arranged parallel to each other. The fixed unit 51 is fixed to the bottom of the illumination optical system unit 40.

The movable unit 55 includes the DMD 551, a movable plate 552 as a first movable member, a joint plate 553 as a second movable member, and a heat sink 554. The movable unit 55 is supported by the fixed unit 51 and is arranged to be movable relative to the fixed unit 51.

The movable plate 552 is provided between the top plate 511 and the base plate 512 of the fixed unit 51. The movable plate 552 is supported by the fixed unit 51 to be movable in a direction parallel to the top plate 511 and the base plate 512 and parallel to the surface of the movable plate 552.

The joint plate 553 is fixed to the movable plate 552, and the base plate 512 of the fixed unit 51 is inserted between the movable plate 552 and the joint plate 553. The DMD 551 is fixed to a top surface of the joint plate 553, and the heat sink 554 is fixed to a bottom surface of the joint plate 553. The joint plate 553, which is fixed to the movable plate 552, is supported by the fixed unit 51 to be movable relative to the fixed unit 51 together with the movable plate 552, the DMD 551, and the heat sink 554.

The DMD 551 is mounted on a surface of the joint plate 553 toward the movable plate 552. The DMD 551 is arranged to be movable integrally with the movable plate 552 and the joint plate 553. The DMD 551 includes an image generation surface having a plurality of rotatable micromirrors arranged into a lattice formation (rectangular array). A specular surface of each of the micromirrors of the DMD 551 is arranged to be slantingly rotatable around a twist shaft. The ON/OFF drive of the micromirrors of the DMD 551 is performed based on an image signal transmitted from the image control unit 11 of the system control unit 10.

For example, in an ON state, an inclination angle of a micromirror is controlled so that the micromirror reflects the light from the light source 30 to the projection optical system unit 60, and in an OFF state, the inclination angle of the micromirror is controlled so that the micromirror reflects the light from the light source 30 to an OFF light plate (not illustrated).

In this way, the inclination angle of each of the micromirrors of the DMD 551 is controlled based on the image signal transmitted from the image control unit 11, and the DMD 551 generates a projection image by modulating the light emitted from the light source 30 and propagated through the illumination optical system unit 40.

The heat sink 554 is an example of a heat dissipation unit. At least a portion of the heat sink 554 is arranged to be in contact with the DMD 551. By mounting the heat sink 554 on the movably supported joint plate 553 together with the DMD 551, the heat sink 554 may be in contact with the DMD 551 to efficiently cool the DMD 551. With such a configuration, the heat sink 554 may prevent the temperature of the DMD 551 from increasing and prevent problems such as malfunction and failure due to the temperature increase of the DMD 551, for example.

(Fixed Unit)

Figure 8:
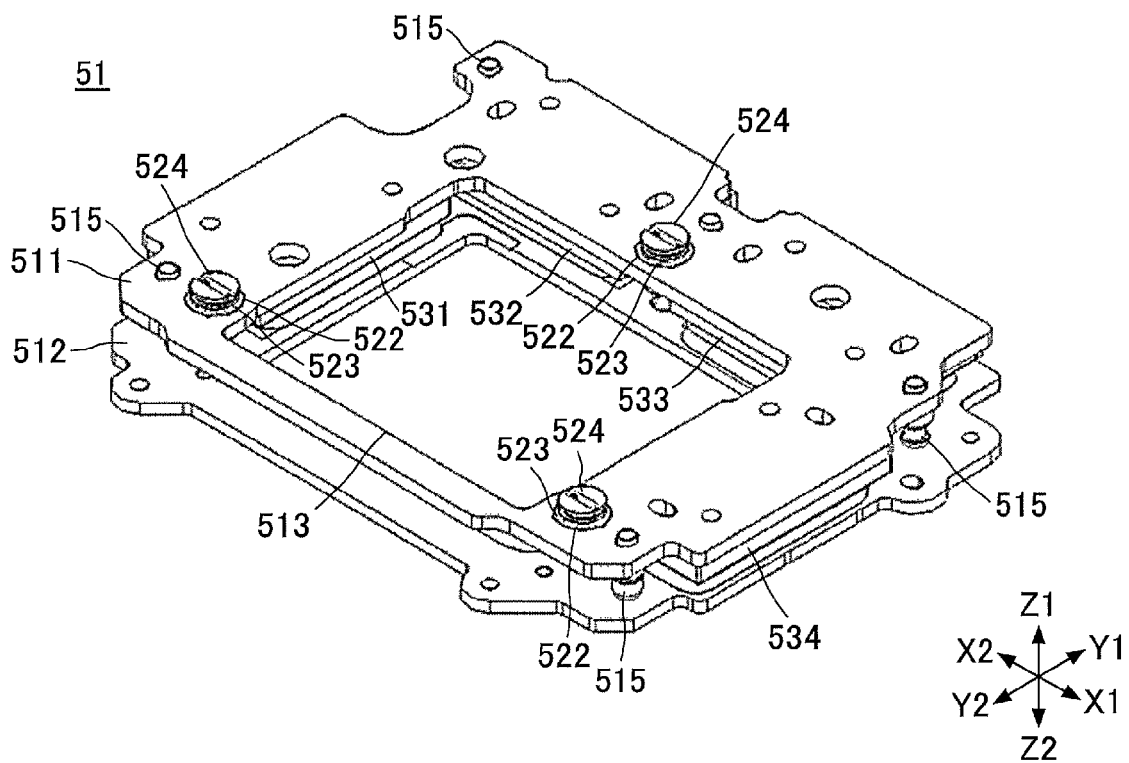
FIG. 8 is a perspective view of a fixed unit of the image display unit according to an embodiment of the present invention.
Figure 9:
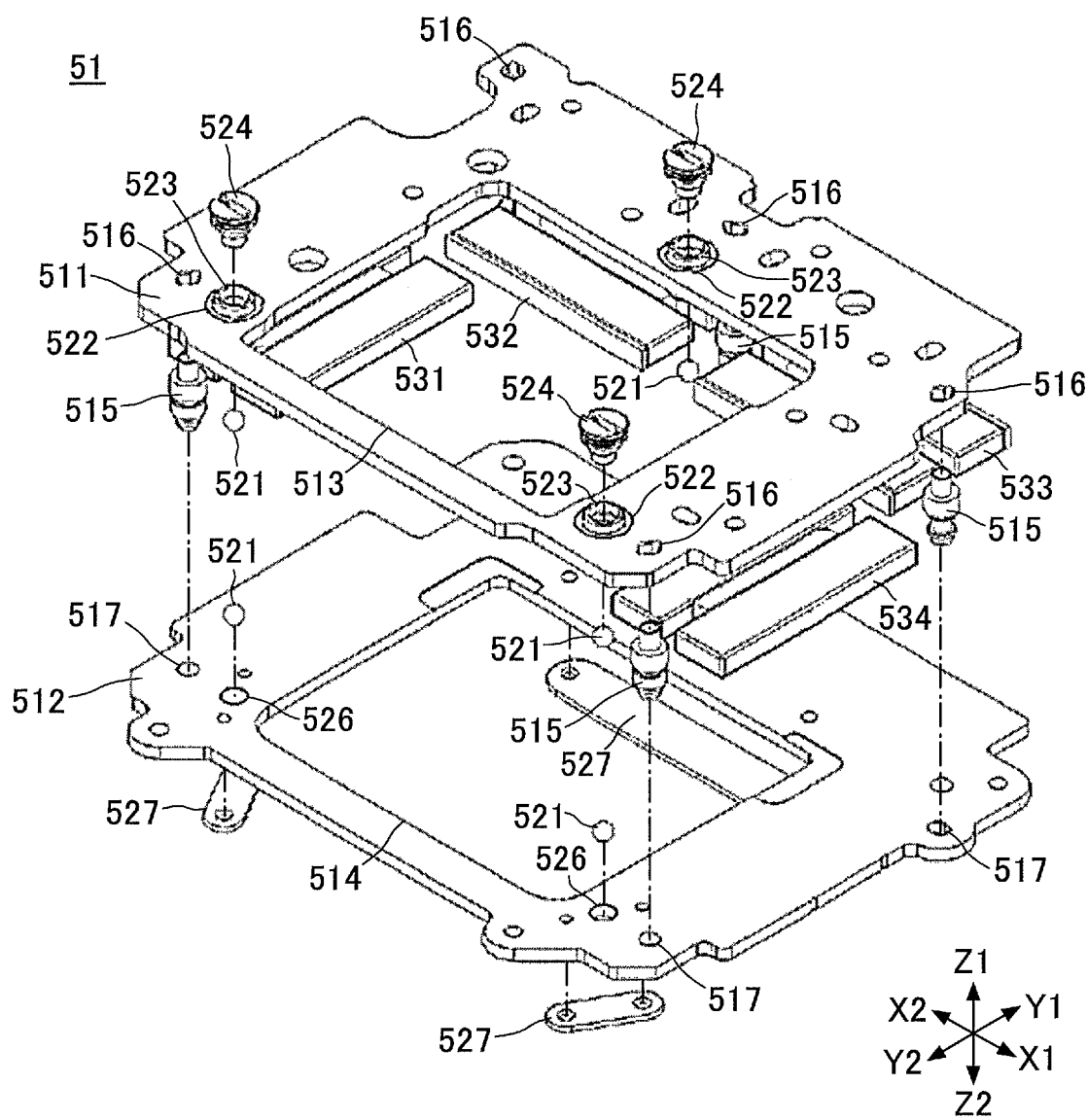
FIG. 9 is an exploded perspective view of the fixed unit.

FIG. 8 is a perspective view of the fixed unit 51. FIG. 9 is an exploded perspective view of the fixed unit 51.

As illustrated in FIG. 8 and FIG. 9, the fixed unit 51 includes the top plate 511 and the base plate 512. The top plate 511 and the base plate 512 may be made of flat plate members. The top plate 511 has a central hole 513 formed therein for accommodating the DMD 551 of the movable unit 55. The base plate 512 has a central hole 514 formed therein for accommodating the DMD 551 of the movable unit 55. The top plate 511 and the base plate 512 are supported by plural supports 515 so that the top plate 511 and the base plate 512 are spaced apart by a predetermined distance and arranged parallel to each other.

As illustrated in FIG. 9, an upper end portion of each of the supports 515 is press fitted in a corresponding one of support holes 516 that are formed in the top plate 511, and a lower end portion of the support 515 is inserted in a corresponding one of support holes 517 that are formed in the base plate 512. Note that an external thread groove is formed at the lower end portion of each of the supports 515. The supports 515 support the top plate 511 and the base plate 512 to be spaced apart by a predetermined distance and parallel to each other.

Also, support holes 522 are formed in the top plate 511 to rotatably hold support balls 521, and support holes 526 are formed in the base plate 512 to rotatably hold support balls 521.

Cylindrical holding members 523 each of which has an internal thread groove formed in an inner peripheral surface of the holding member 523 are inserted in the support holes 522 of the top plate 511. The holding members 523 are configured to rotatably hold the support balls 521. Positioning screws 524 are inserted into upper end portions of the holding members 523. The lower ends of the support holes 526 of the base plate 512 are closed by lid members 527, and the support holes 526 of the base plate 512 rotatably hold the support balls 521.

The support balls 521, which are rotatably held by the support holes 522 and 526 of the top plate 511 and the base plate 512, are arranged to be in contact with the movable plate 552, which is provided between the top plate 511 and the base plate 512. In this way, the support balls 521 movably support the movable plate 552.

Figure 10:
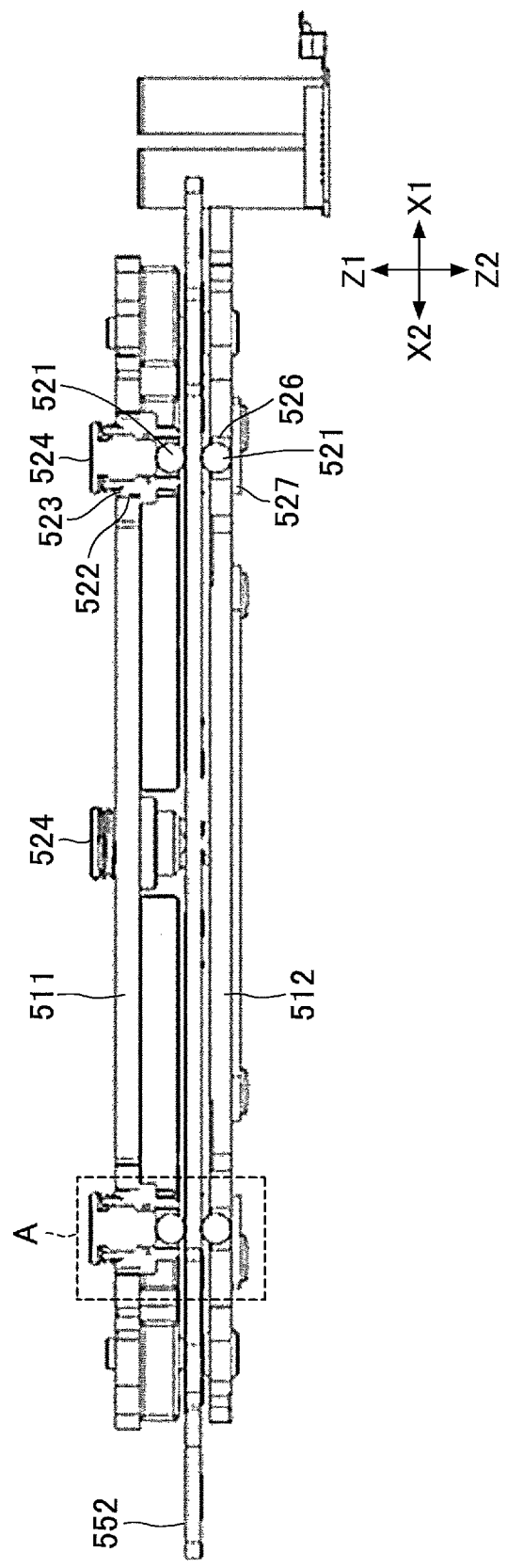
FIG. 10 is a diagram illustrating a support structure for a movable plate provided by the fixed unit according to an embodiment of the present invention.
Figure 11:
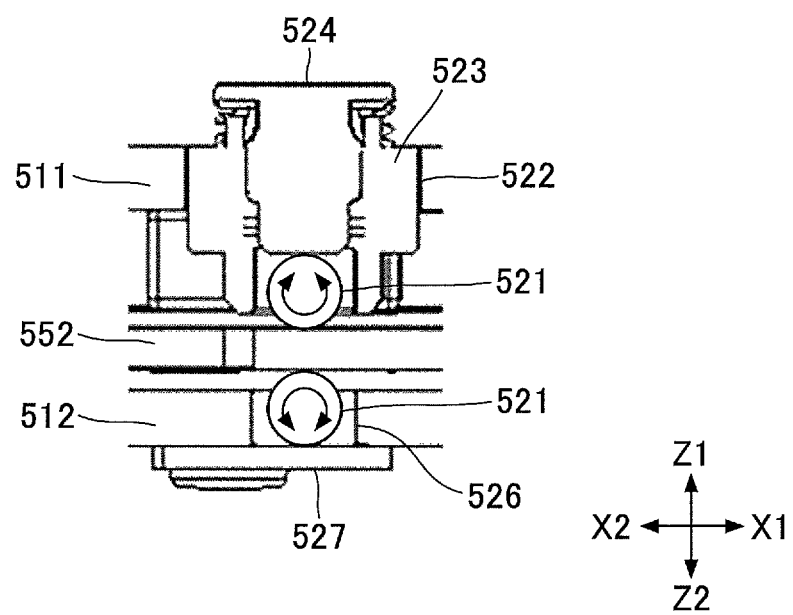
FIG. 11 is a partial enlarged view of the support structure for the movable plate provided by the fixed unit.

FIG. 10 is a diagram illustrating a support structure for the movable plate 552 provided by the fixed unit 51. FIG. 11 is an enlarged diagram illustrating a portion (indicated by the letter "A" in FIG. 10) of the support structure for the movable plate 552 provided by the fixed unit 51.

As illustrated in FIG. 10 and FIG. 11, in the top plate 511, the support balls 521 are rotatably held by the holding members 523, which are inserted in the support holes 522. In the base plate 512, the support balls 521 are rotatably held by the support holes 526, which have lower ends closed by the lid members 527.

Each of the support balls 521 is held so that the support ball 521 projects at least partially from the support hole 522 or the support hole 526. Each of the support balls 521 are in contact with the movable plate 552 to support the movable plate 552, which is provided between the top plate 511 and the base plate 512. The top surface and the bottom surface of the movable plate 552 are supported by the rotatably held support balls 521 so that the movable plate 552 may be movable in the direction parallel to the top plate 511 and the base plate 512 and parallel to the top and bottom surfaces of the movable plate 552.

Also, the support ball 521 held by the holding member 523 of the top plate 511 and projecting downward from the lower end of the holding member 523 may be controlled to project at varying amounts depending on a position of the positioning screw 524, which is inserted from the opposite side (upper end of the holding member 523 opposite the movable plate 552) to come into contact with the support ball 521. For example, if the positioning screw 524 is displaced in the Z1 direction (upward), the amount of projection of the support ball 521 is reduced and the distance between the top plate 511 and the movable plate 552 is reduced. On the other hand, if the positioning screw 524 is displaced in the Z2 direction (downward), the amount of projection of the support ball 521 is increased and the distance between the top plate 511 and the movable plate 552 is increased.

In this way, the distance between the top plate 511 and the movable plate 552 may be suitably adjusted by changing the amount of projection of the support ball 521 using the positioning screw 524.

Also, as illustrated in FIG. 8 and FIG. 9, magnets 531, 532, 533 and 534 are mounted on a bottom surface of the top plate 511 facing the base plate 512.

Figure 12:
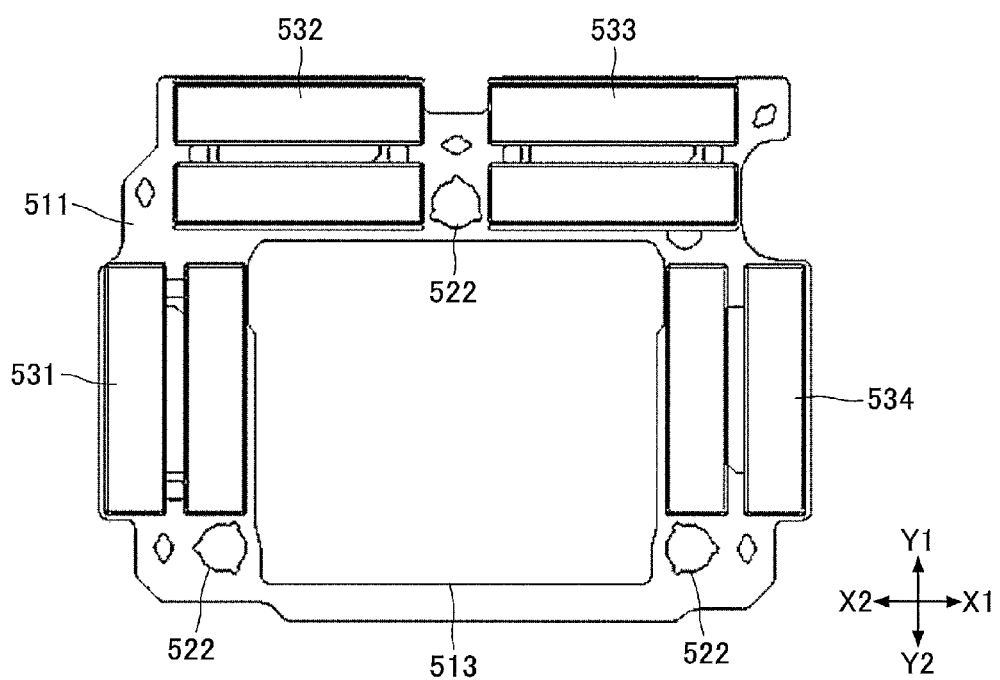
FIG. 12 is a bottom view of a top plate of the fixed unit according to an embodiment of the present invention.

FIG. 12 is a bottom view of the top plate 511. As illustrated in FIG. 12, the magnets 531, 532, 533 and 534 are mounted on the bottom surface of the top plate 511 facing the base plate 512.

The magnets 531, 532, 533 and 534 are provided at four locations surrounding the central hole 513 of the top plate 511. Each of the magnets 531, 532, 533 and 534 is made of a pair of magnet pieces having a rectangular parallelepiped shape. The two magnet pieces of each pair are arranged side by side so that longitudinal directions of the two magnet pieces are parallel to each other. Each of the magnets 531, 532, 533 and 534 forms a magnetic field attracting the movable plate 552.

Coils are provided on the top surface of the movable plate 552 to face the magnets 531, 532, 533 and 534. As described below, the magnets 531, 532, 533 and 534 on the top plate 511 and the corresponding coils on the movable plate 552 constitute a moving unit for moving the movable plate 552.

Note that the number and positions of the supports 515 and the support balls 521 that are provided on the fixed unit 51 are not limited to the configuration described above as long as the supports 515 and the support balls 521 are arranged to movably support the movable plate 552.

(Movable Unit)

Figure 13:
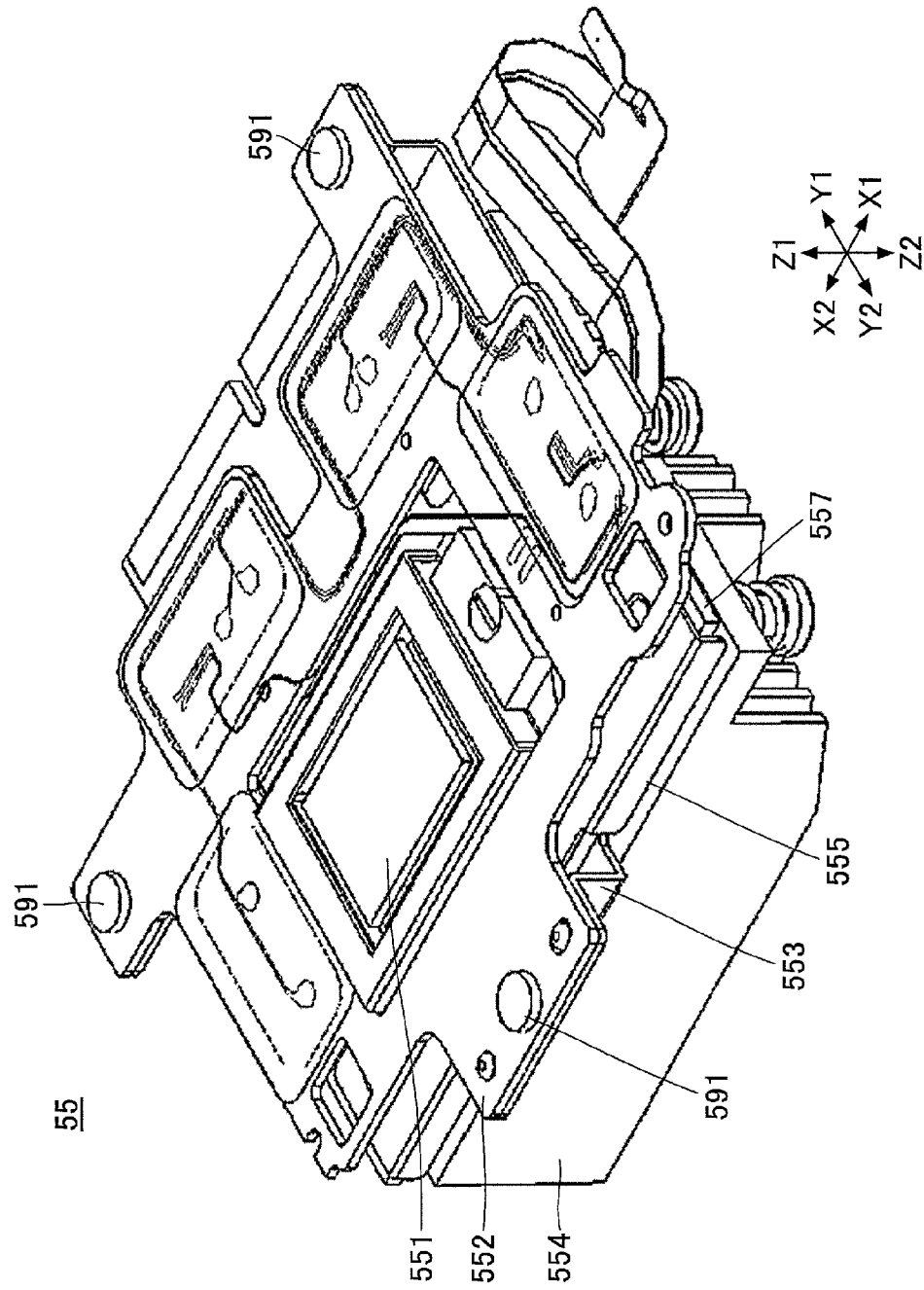
FIG. 13 is a perspective view of a movable unit of the image display unit according to an embodiment of the present invention.
Figure 14:
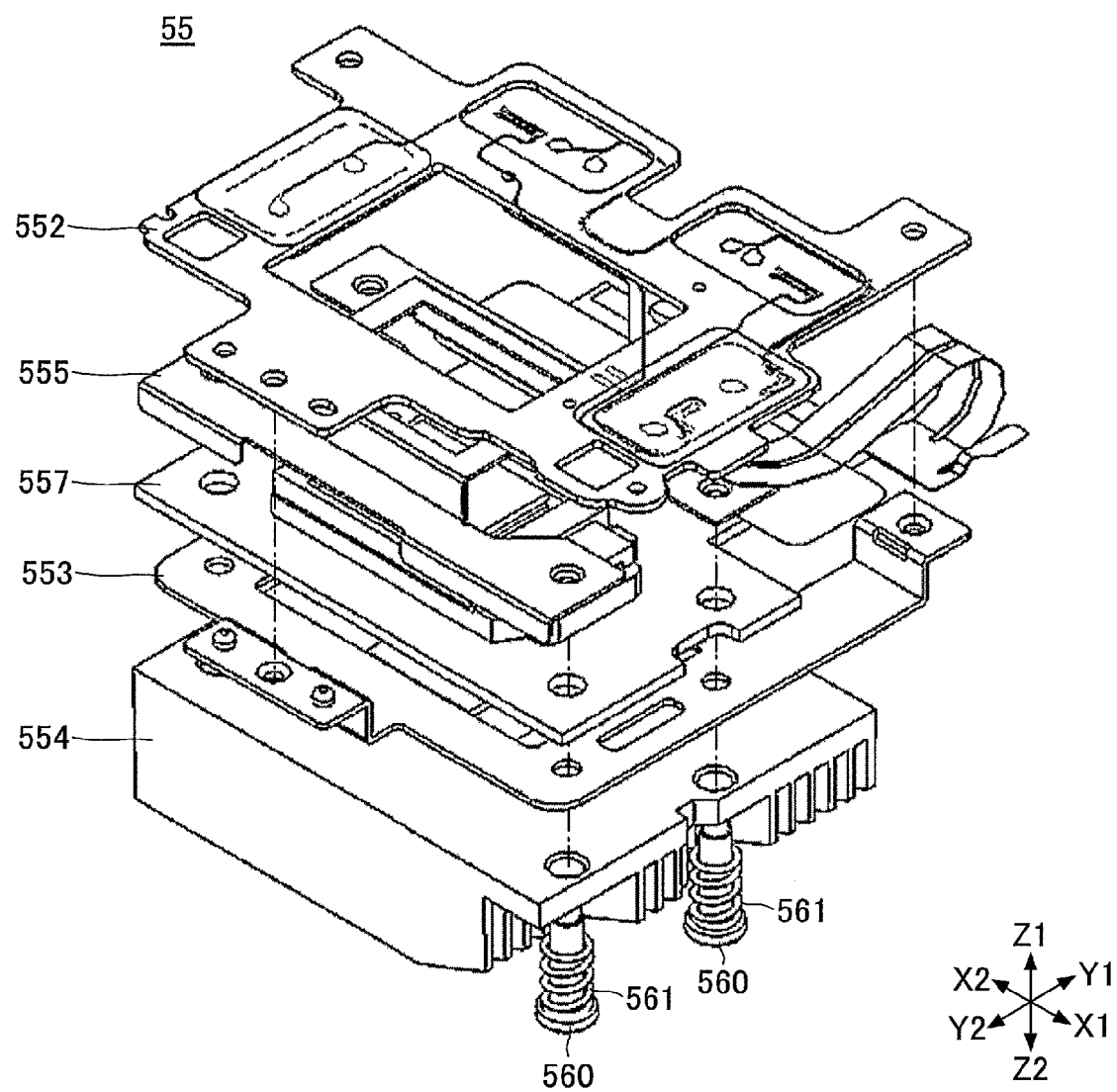
FIG. 14 is an exploded perspective view of the movable unit.

FIG. 13 is a perspective view of the movable unit 55. FIG. 14 is an exploded perspective view of the movable unit 55.

As illustrated in FIG. 13 and FIG. 14, the movable unit 55 includes the DMD 551, the movable plate 552, the joint plate 553, the heat sink 554, a holding member 555, and a DMD base 557. The movable unit 55 is supported by the fixed unit 51 to be movable relative to the fixed unit 51.

As described above, the movable plate 552 is provided between the top plate 511 and the base plate 512 of the fixed unit 51 and is supported by the support balls 521 to be movable in the direction parallel to the top and bottom surfaces of the movable plate 552.

Figure 15:
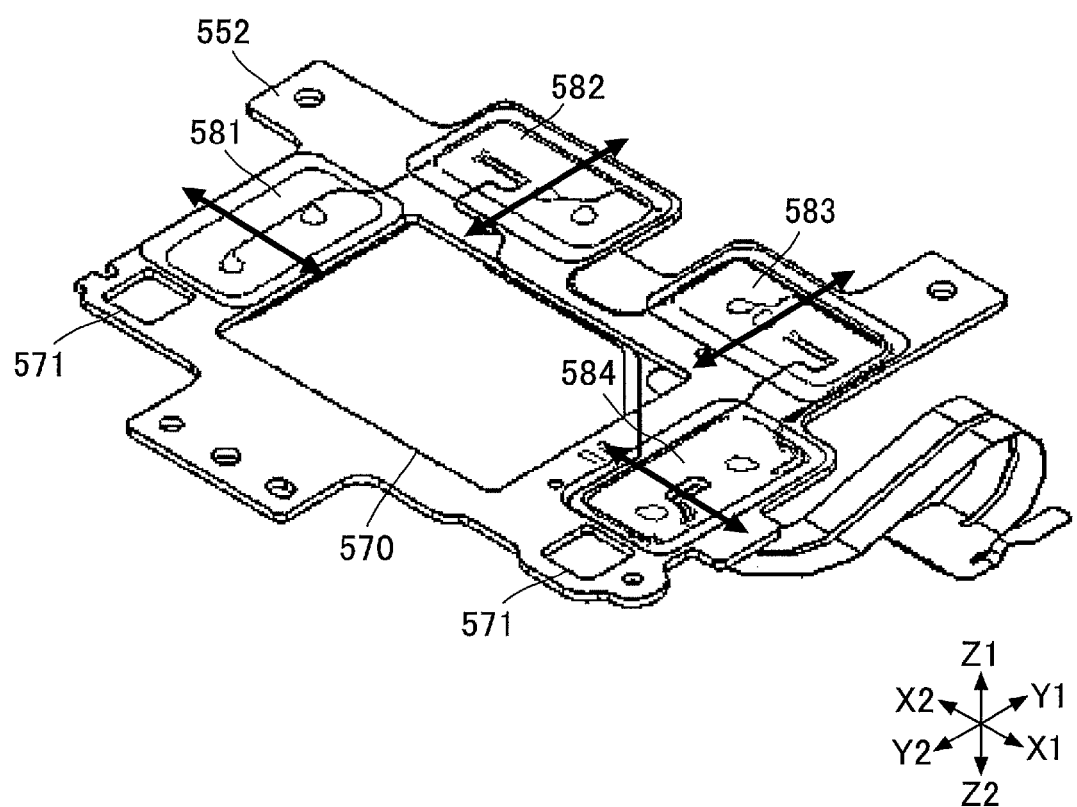
FIG. 15 is a perspective view of the movable plate according to an embodiment of the present invention.

FIG. 15 is a perspective view of the movable plate 552. As illustrated in FIG. 15, the movable plate 552 may be made of a flat plate member. The movable plate 552 has a central hole 570 formed therein for accommodating the DMD 551, which is mounted on the DMD base 557. Coils 581, 582, 583 and 584 are formed around the periphery of the central hole 570.

Each of the coils 581, 582, 583 and 584 is formed of electric wires wound around a shaft parallel to the Z1-Z2 directions. The coils 581, 582, 583 and 584 are provided in recesses formed in the bottom surface of the top plate 511 facing the movable plate 552, and the coils are covered by covers. The coils 581, 582, 583 and 584 on the movable plate 552 and the magnets 531, 532, 533 and 534 on the top plate 511 constitute the moving unit for moving the movable plate 552.

When the movable unit 55 is supported by the fixed unit 51, the magnets 531, 532, 533 and 534 on the top plate 511 and the coils 581, 582, 583 and 584 on the movable plate 552 face each other. When an electric current flows through the coils 581, 582, 583 and 584 in such a state, Lorentz forces as driving forces for moving the movable plate 552 are generated by the magnetic fields formed by the coils 581, 582, 583 and 584 and the magnets 531, 532, 533 and 534.

The movable plate 552 is linearly moved or rotated with respect to the fixed unit 51 within an XY plane by the Lorentz forces as the driving forces generated by the magnets 531, 532, 533 and 534 and the coils 581, 582, 583 and 584.

The magnitude and direction of the current flowing through each of the coils 581, 582, 583 and 584 are controlled by the movement control unit 12 of the system control unit 10. The movement control unit 12 controls the direction of movement (or rotation), the displacement and the rotational angle of the movable plate 552 by changing the magnitude and direction of the current flowing through each of the coils 581, 582, 583 and 584.

In the present embodiment, the coil 581 and the magnet 531, and the coil 584 and the magnet 534 are arranged to oppose each other in the X1-X2 directions to constitute a first drive unit. When an electric current flows through the coils 581 and 584, Lorentz forces in the X1 direction or the X2 direction are generated as illustrated in FIG. 15. The movable plate 552 is moved in the X1 direction or the X2 direction by the Lorentz force generated by the coil 581 and the magnet 531 and the Lorentz force generated by the coil 584 and the magnet 534.

Also, in the present embodiment, the coil 582 and the magnet 532, and the coil 583 and the magnet 533 are arranged side by side in the X1-X2 direction to constitute a second drive unit, and the longitudinal direction of the magnets 532 and 533 is arranged to be perpendicular to the longitudinal direction of the magnets 531 and 534. When an electric current flows through the coil 582 and the coil 583, Lorentz forces in the Y1 direction or the Y2 direction are generated as illustrated in FIG. 15.

The movable plate 552 may be moved in the Y1 direction or the Y2 direction by the Lorentz force generated by the coil 582 and the magnet 532 and the Lorentz force generated by the coil 583 and the magnet 533 when the generated Lorentz forces are in the same direction. Also, the movable plate 552 may be rotated within the XY plane by the Lorentz force generated by the coil 582 and the magnet 532, and the Lorentz force generated by the coil 583 and the magnet 533 when the generated Lorentz forces are in opposite directions.

For example, if an electric current is supplied so that a Lorentz force in the Y1 direction is generated by the coil 582 and the magnet 532 and a Lorentz force in the Y2 direction is generated by the coil 583 and the magnet 533, the movable plate 552 is rotated clockwise as viewed from the top. On the other hand, if an electric current is supplied so that a Lorentz force in the Y2 direction is generated by the coil 582 and the magnet 532 and a Lorentz force in the Y1 direction is generated by the coil 583 and the magnet 533, the movable plate 552 is rotated counterclockwise as viewed from the top.

In the movable plate 552, movable range restriction holes 571 are formed at locations corresponding to the supports 515 of the fixed unit 51. The supports 515 of the fixed unit 51 are inserted in the movable range restriction holes 571. In this way, when vibrations or some abnormality causes a substantially large displacement of the movable plate 552, the supports 515 may come into contact with the movable range restriction holes 571 to thereby restrict the movable range of the movable plate 552.

As described above, in the present embodiment, the movement control unit 12 of the system control unit 10 can move the movable plate 552 to a given position within the movable range by controlling the magnitude and direction of the current flowing through the coils 581, 582, 583 and 584.

Note that the number and positions of the coils 581, 582, 583 and 584 and the magnets 531, 532, 533 and 534, which constitute the moving unit, are not limited to the present embodiment. That is, the coils and magnets may be arranged in other various configurations to enable displacement of the movable plate 552 to a desired position. For example, the magnets in the moving unit may be mounted on the top surface of the top plate 511, or mounted on any of the surfaces of the base plate 512. Alternatively, the magnets may be mounted on the movable plate 552, and the coils may be mounted on the top plate 511 or the base plate 512, for example.

Moreover, the number, the positions, and the shape of the movable range restriction holes 571 are not limited to the configuration of the present embodiment. For example, one movable range restriction hole 571 or plural movable range restriction holes 571 may be provided, and the movable range restriction holes 571 may be in various shapes, such as a rectangular shape or circular shape, for example.

As illustrated in FIG. 13, the joint plate 553 is fixed to the bottom surface of the movable plate 552 (facing the base plate 512), and the movable plate 552 is movably supported by the fixed unit 51. The joint plate 553 may be made of a flat plate member and has a central hole formed therein for accommodating the DMD 551. The joint plate 553 also has folded portions formed along its periphery, and the folded portions are fixed to the bottom surface of the movable plate 552 by three screws 591.

Figure 16:
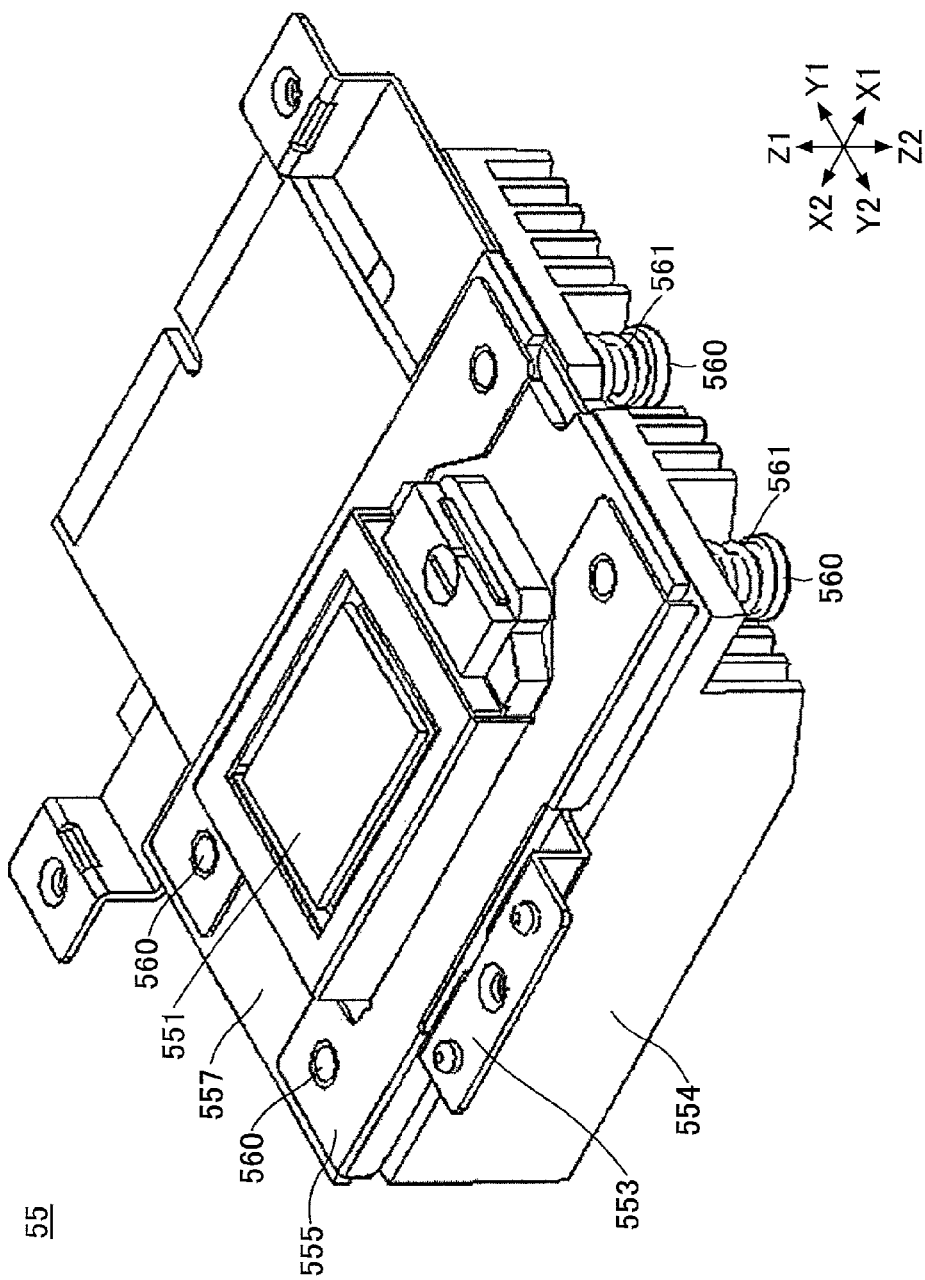
FIG. 16 is a perspective view of the movable unit with the movable plate removed therefrom.

FIG. 16 is a perspective view of the movable unit 55 from which the movable plate 552 is removed. As illustrated in FIG. 16, the DMD 551 is mounted on the top surface of the joint plate 553, and the heat sink 554 is mounted on the bottom surface of the joint plate 553. The joint plate 553 is fixed to the movable plate 552 such that the joint plate 533, together with the DMD 551 and the heat sink 554, may be moved relative to the fixed unit 51 along with the movable plate 552.

The DMD 551 is mounted on the DMD base 557, and the DMD base 557 is interposed between the holding member 555 and the joint plate 553. In this way, the DMD 551 is fixed to the joint plate 553 via the DMD base 557. As illustrated in FIG. 14 and FIG. 16, the holding member 555, the DMD base 557, the joint plate 553, and the heat sink 554 are stacked one on top of the other and fixed by shoulder screws 560 (as fastening members) and springs 561 (as pressure units).

Figure 17:
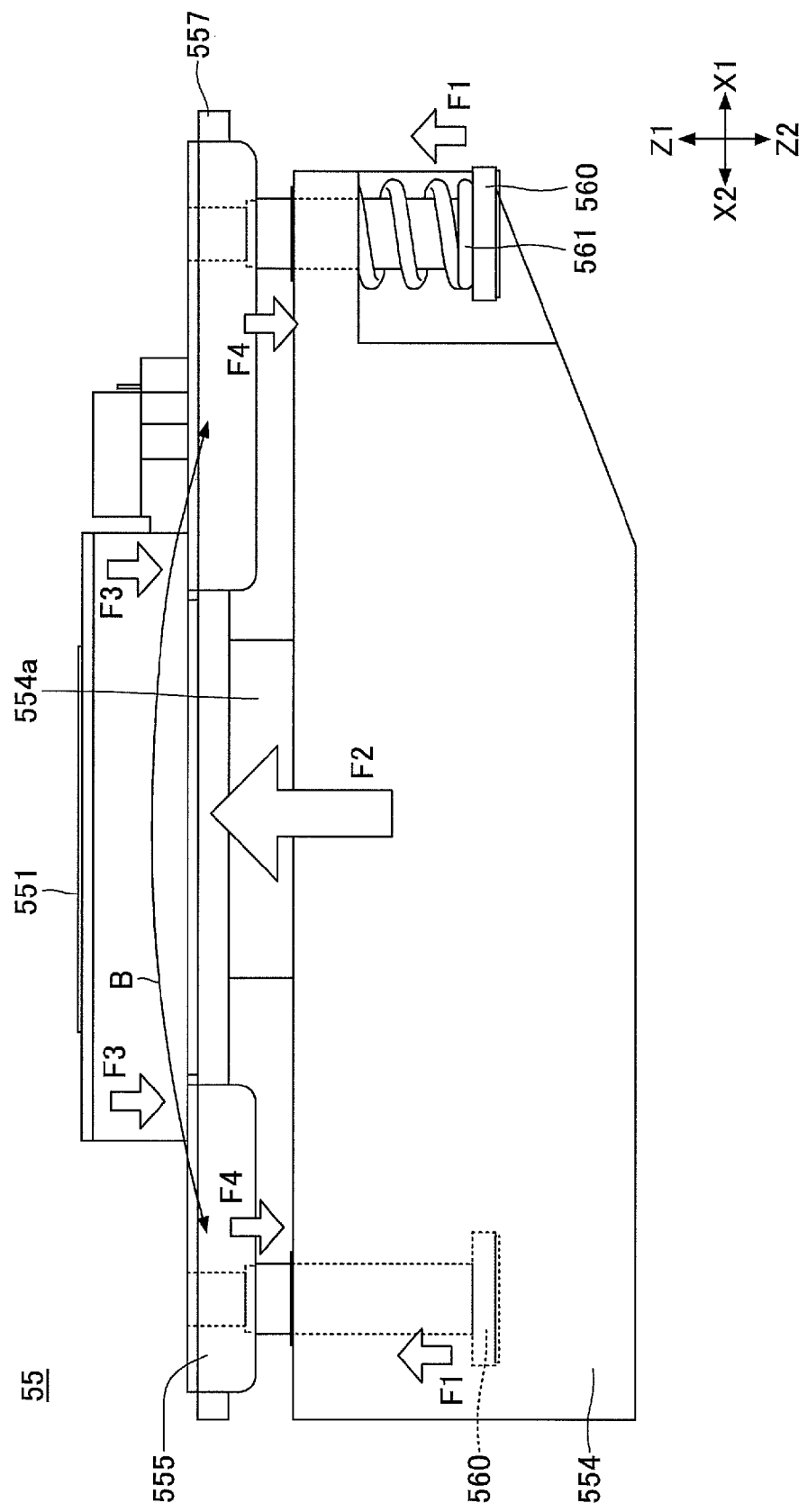
FIG. 17 is a diagram illustrating a digital micromirror device holding structure of the movable unit according to an embodiment of the present invention.

FIG. 17 is a diagram illustrating a DMD holding structure for the movable unit 55. FIG. 17 is a side view of the movable unit 55. Note that in FIG. 17, illustrations of the movable plate 552 and the joint plate 553 are omitted.

As illustrated in FIG. 17, the heat sink 554 includes a projection 554a that comes into contact with the bottom surface of the DMD 551 via a through hole formed in the DMD base 557 when the heat sink 554 is fixed to the joint plate 553. Note that in other embodiments, the projection 554a of the heat sink 554 may be configured to come into contact with the bottom surface of the DMD base 557 at a position where the DMD 551 is mounted, for example.

Also, in some embodiments, a heat transfer sheet that is elastically deformable may be interposed between the projection 554a of the heat sink 554 and the DMD 551 in order to enhance the cooling effect of the heat sink 554 for cooling the DMD 551, for example. In this way, thermal conductivity between the projection 554a of the heat sink 554 and the DMD 551 may be increased by the heat transfer sheet, and as a result, the cooling effect of the heat sink 554 for cooling the DMD 551 may be improved.

As described above, the holding member 555, the DMD base 557, and the heat sink 554 are stacked one on top of the other and fixed by the shoulder screws 560 and the springs 561. When the shoulder screws 560 are tightened, the springs 561 are compressed in the Z1-Z2 directions, and forces F1 in the Z1 direction (see FIG. 17) are produced by the springs 561. The heat sink 554 is pressed onto the DMD 551 by a force F2 in the Z1 direction resulting from the forces F1 produced by the springs 561.

In the present embodiment, the shoulder screws 560 and the springs 561 are provided at four locations, and the force F2 acting on the heat sink 554 is equal to the combined forces F1 produced by the four springs 561. The force F2 from the heat sink 554 is exerted on the holding member 555, which holds the DMD base 557 having the DMD 551 mounted thereon. As a result, a reaction force F3 in the Z2 direction equivalent to the force F2 from the heat sink 554 is exerted on the holding member 555, so that the DMD base 557 can be held between the holding member 555 and the joint plate 553.

The force F3 acting on the holding member 555 causes forces F4 in the Z2 direction to act on the shoulder screws 560 and the springs 561. Because the springs 561 are provided at four locations, the force F4 acting on each of the springs is equivalent to one fourth (¼) of the force F3 acting on the holding member 555, and the force F4 and the force F1 are in equilibrium.

The holding member 555 is a plate spring made of a material that can be bent as indicated by arrow B in FIG. 17. The holding member 555 may be bent by the upward force from the projection 554a of the heat sink 554 to thereby generate a downward force pushing back the heat sink 554 in the Z2 direction, and in this way, firm contact between the DMD 551 and the heat sink 554 may be maintained.

As described above, in the movable unit 55, the movable plate 552, and the joint plate 553 (on which the DMD 551 and the heat sink 554 are mounted) are movably supported by the fixed unit 51. The position of the movable unit 55 is controlled by the movement control unit 12 of the system control unit 10. Also, the heat sink 554 that is in contact with the DMD 551 is mounted on the movable unit 55, and in this way, malfunction and failure due to a temperature increased of the DMD 551 may be reduced, for example.

<Image Projection>

As described above, in the projector 1 according to the present embodiment, the DMD 551 that generates a projection image is mounted on the movable unit 55, and the movement control unit 12 of the system control unit 10 controls the position of the DMD 551 together with the movable unit 55.

For example, during image projection, the movement control unit 12 may control the position of the movable unit 55 at a predetermined cycle based on the frame rate to cause the DMD 551 to move rapidly between plural positions separated by a distance less than an array interval of the plurality of micromirrors of the DMD 551. At this time, the image control unit 11 transmits an image signal to the DMD 551 to generate a projection image shifted according to the position of the DMD 551.

For example, the movement control unit 12 may control the DMD 551 to move back and forth between two positions separated by a distance less than the array interval of the plurality of micromirrors of the DMD 551 in the X1-X2 directions and the Y1-Y2 directions at the predetermined cycle. At this time, the image control unit 11 controls the DMD 551 to generate a projection image shifted according to the position of the DMD 551, and in this way, the resolution of the projection image may be increased to twice the resolution of the DMD 551, for example. Moreover, the resolution of the projection image may be increased to more than twice the resolution of the DMD 551 by increasing the movement range of the DMD 551, for example.

By having the movement control unit 12 move the DMD 551 and the movable unit 55 at the predetermined cycle and having the image control unit 11 control the DMD 551 to generate the projection image according to its position as described above, an image with a resolution higher than the resolution of the DMD 551 may be projected by the projector 1.

Also, in the projector 1 according to the present embodiment, the movement control unit 12 may control the DMD 551 to rotate integrally with the movable unit 55, and in this way, a projection image can be rotated without reducing the size of the projection image. For example, in a projector having an image generation unit (e.g., DMD) that is fixed in place, if the size of a projection image is not reduced, the projection image cannot be rotated while maintaining the aspect ratio of the projection image. In contrast, in the projector 1 according to the present embodiment, the DMD 551 can be rotated, and the rotation of the DMD 551 and the adjustment of the inclination can be performed without reducing the size of the projection image.

As described in the foregoing, in the projector 1 according to the present embodiment, the DMD 551 is arranged to be movable, and in this way, the resolution of a projection image projected by the projector 1 may be increased. Also, by mounting the heat sink 554 for cooling the DMD 551 on the movable unit 55 together with the DMD 551, the heat sink 554 may be in contact with the DMD 551 and thereby be able to more efficiently cool the DMD 551. In this way, the temperature of the DMD 551 may be prevented from increasing. Thus, the projector 1 may be less susceptible to problems, such as malfunction and failure due to increased temperatures of the DMD 551, for example.

(Relay Lens)

Figure 18:
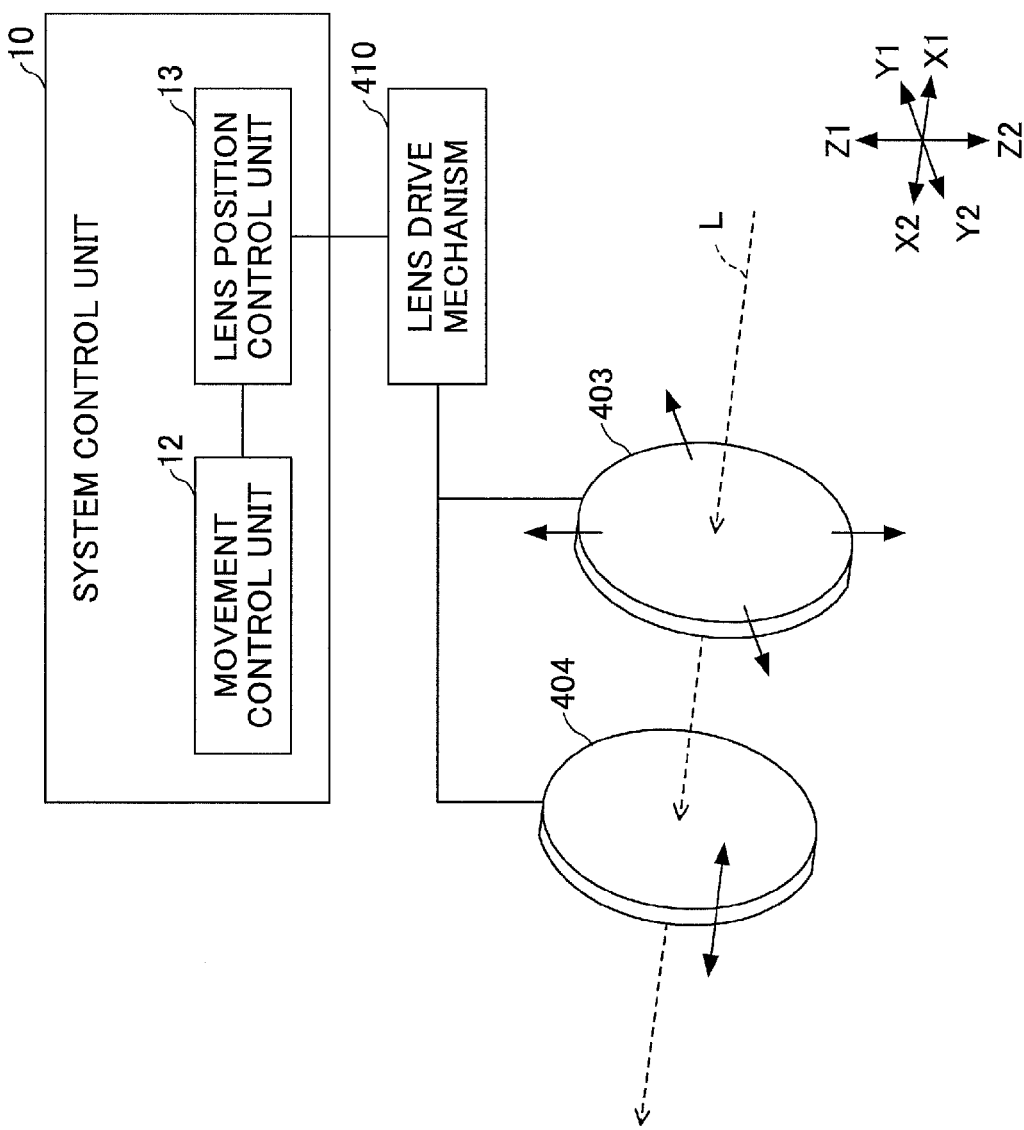
FIG. 18 is a diagram illustrating a configuration of relay lenses according to an embodiment of the present invention.

FIG. 18 is a diagram illustrating an example configuration of the relay lenses 403 and 404 according to an embodiment of the present invention.

The relay lens 403 as an example of a first lens and the relay lens 404 as an example of a second lens are arranged along the optical axis L of the relay lens 403 parallel to the X1-X2 directions. The relay lenses 403 and 404 correct on-axis chromatic aberrations of the light beams emitted from the light tunnel 402 (not illustrated in FIG. 18) and convert the light beams into converging light beams.

As illustrated in FIG. 18, the relay lens 403 is arranged to be movable in the Y1-Y2 directions and the Z1-Z2 directions. The relay lens 404 is arranged to be movable in the X1-X2 directions, which is parallel to the optical axis L of the relay lens 403. Thus, the face-to-face distance between the relay lens 403 and the relay lens 404 may be changed by moving the relay lens 404.

In the present embodiment, a lens drive mechanism 410 including an actuator, for example, is capable of displacing the relay lens 403 and the relay lens 404 in predetermined directions. Specifically, a first stepping motor for displacing the relay lens 403 in the vertical directions of the projector 1 (Z1-Z2 directions) is connected to a frame supporting the relay lens 403. Also, a second stepping motor for displacing the relay lens 403 and the first stepping motor in radial directions of the relay lens 403 perpendicular to the Z1-Z2 directions (Y1-Y2 directions) is connected to the frame supporting the relay lens 403 and the first stepping motor. Also, a third stepping motor for displacing the relay lens 404 in directions parallel to the optical axis L of the relay lens 403 (X1-X2 directions); i.e., directions that change the face-to-face distance between the relay lens 403 and the relay lens 404, is connected to a frame supporting the relay lens 404.

In the present example, the system control unit 10 includes a lens position control unit 13 that controls the lens drive mechanism 410 to adjust the amount of displacement and the direction of displacement of the relay lenses 403 and 404. The lens position control unit 13 controls the positions of the relay lenses 403 and 404 based on the position of the DMD 551 obtained from the movement control unit 12. Specifically, the lens drive mechanism 410 may be controlled by the lens position control unit 13 to drive the first stepping motor and thereby displace the relay lens 403 in the Z1 direction or the Z2 direction. Also, the lens drive mechanism 410 may be controlled by the lens position control unit 13 to drive the second stepping motor and thereby displace the relay lens 403 in the Y1 direction or the Y2 direction. Further, the lens drive mechanism 410 may be controlled by the lens position control unit 13 to drive the third stepping motor and thereby displace the relay lens 404 in the X1 direction or the X2 direction; i.e., direction that changes the face-to-face distance between the relay lens 403 and the relay lens 404.

Figure 19:
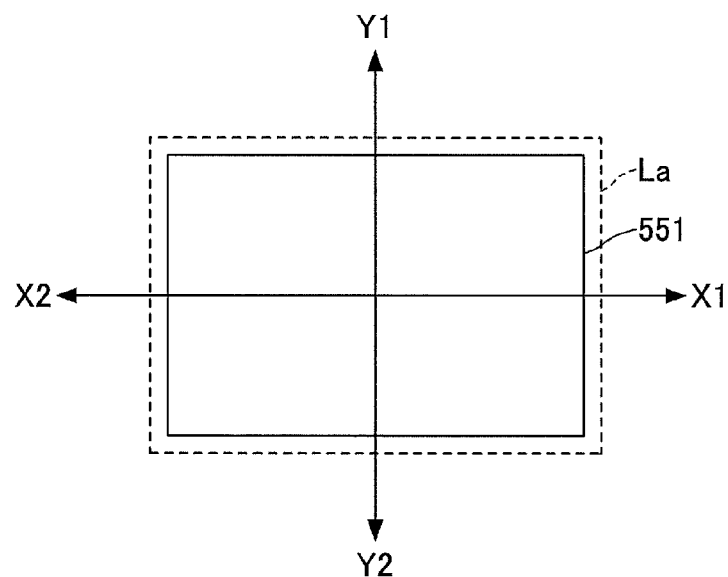
FIG. 19 is a schematic view of a digital micromirror device and a light irradiation range according to an embodiment of the present invention.

FIG. 19 is a schematic view of the DMD 551 and an irradiation range La of light incident on the DMD 551 according to an embodiment of the present invention.

Light guided by the relay lenses 403 and 404 may be reflected by the cylindrical mirror 405 and the concave mirror 406 of the illumination optical system unit 40 to be irradiated on the the light irradiation range La of the DMD 551 as illustrated in FIG. 19, for example.

The lens position control unit 13 is capable of changing the position and size of the light irradiation range La by changing the positions of the relay lenses 403 and 404. For example, the lens position control unit 13 may displace the relay lens 403 in the Z1 direction to displace the light irradiation range La in the X1 direction. Similarly, the lens position control unit 13 may displace the relay lens 403 in the Z2 direction, the Y1 direction, or the Y2 direction, for example, to displace the light irradiation range La in the X2 direction, the Y1 direction, or the Y2 direction.

Further, the lens position control unit 13 may display the position of the relay lens 403 in the Y1/Y2 direction and the Z1/Z2 direction at the same time, for example, to displace the light irradiation range La in a diagonal direction with respect to the X1-X2 directions and the Y1-Y2 directions.

Further, the lens position control unit 13 may displace the relay lens 404 in the X1 direction to increase the size of the light irradiation range La, and the lens position control unit 13 may displace the relay lens 404 in the X2 direction to reduce the size of the light irradiation range La, for example.

Note that the lens position control unit 13 controls the positions of the relay lenses 403 and 404 such that the light irradiation range La on which light is irradiated covers substantially the entire surface of the DMD 551. By irradiating light on the entire surface of the DMD 551, defects such as partial image loss of the image projected on the screen S may be prevented, for example.

Further, the lens position control unit 13 controls the positions of the relay lenses 403 and 404 such that the area of the light irradiation range La and the surface area of the DMD 551 may be approximately the same to minimize an area other than the surface area of the DMD 551 onto which light is irradiated. In this way, the amount of light reflected by the DMD 551 may be increased, and brightness of the image projected on the screen S may be increased.

Figure 20:
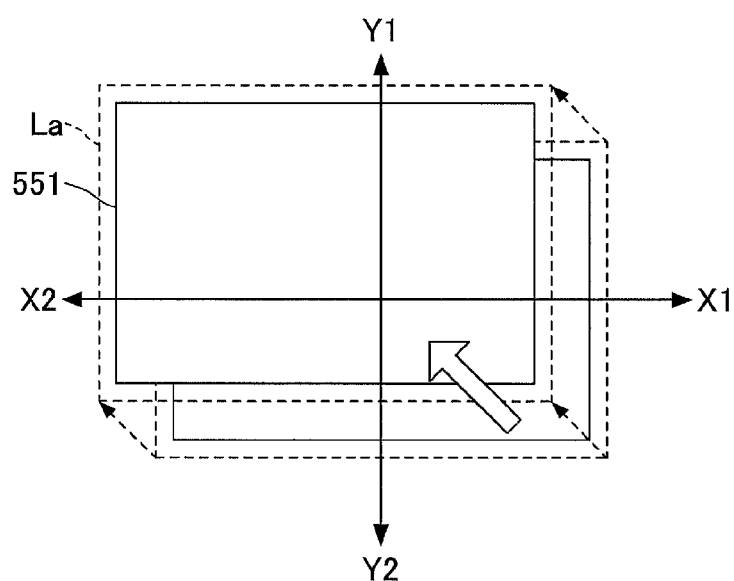
FIG. 20 is a diagram illustrating an example case of controlling the light irradiation range according to a displacement of the digital micromirror device according to an embodiment of the present invention.

For example, as illustrated in FIG. 20, when the DMD 551 is displaced in the X2 direction and the Y1 direction, the lens position control unit 13 may displace the relay lens 403 in the Y1 direction and the Z2 direction to adjust the position of the light irradiation range La to match the position of the DMD 551. Note that the lens position control unit 13 displaces the relay lens 403 based on position information of the DMD 551 obtained from the movement control unit 12.

Figure 21:
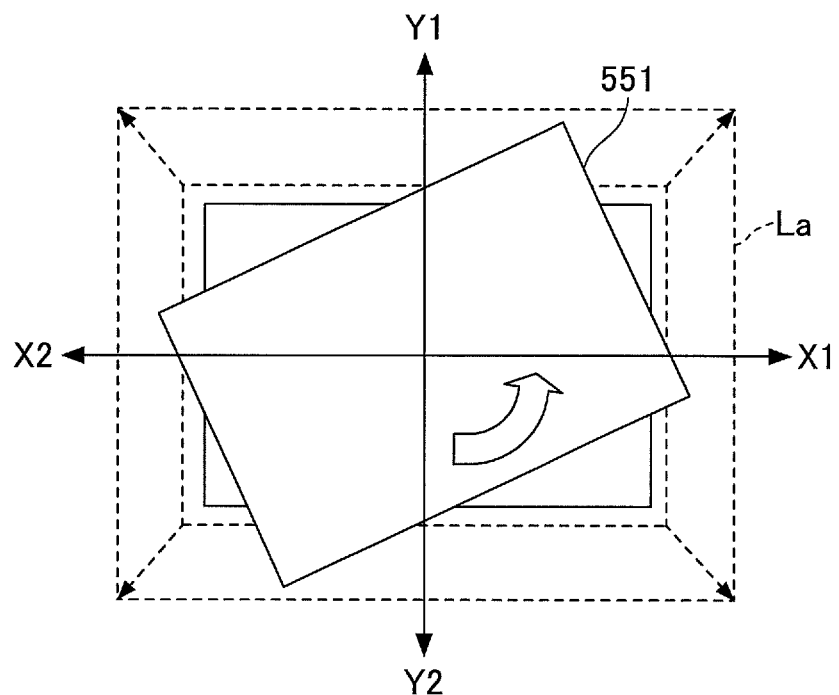
FIG. 21 is a diagram illustrating another example case of controlling the light irradiation range according to a displacement of the digital micromirror device according to an embodiment of the present invention.

Also, as illustrated in FIG. 21, for example, when the DMD 551 is rotated, the lens position control unit 13 may displace the relay lens 404 in the X2 direction to alter the size of the light irradiation range La such that light may be irradiated on substantially the entire surface of the DMD 551. Note that the lens position control unit 13 displaces the relay lens 404 based on rotation information of the DMD 551 obtained from the movement control unit 12.

As described above, even when the DMD 551 is displaced, the relay lenses 403 and 404 may be displaced according to the position of DMD 551 and at least one of the position and the size of the light irradiation range La may be adjusted according to the displacement of the DMD 551. Thus, even when the DMD 551 is displaced, the light irradiation range La may be controlled to always cover the entire DMD 551 such that light may be irradiated onto the entire DMD 551. In this way, image quality degradation such as partial image loss of a projection image can be prevented, for example.

As described above, in the illumination optical system unit 40 according to the present embodiment, the relay lens 403 and/or the relay lens 404 may be moved to adjust the position and/or size of the light irradiation range La according to the position of the DMD 551. By moving the relay lens 403 and/or the relay lens 404, image quality degradation, such as partial image loss or a decrease in brightness, of a projection image generated by the DMD 551 may be prevented, for example.

Note that the configuration of the relay lenses in the illumination optical system unit 40 is not limited to the above embodiment. For example, in some embodiments, the relay lens 403 may be arranged to be movable in the directions parallel to the optical axis L of the relay lens 403, and the relay lens 404 may be arranged to be movable in the directions perpendicular to the optical axis L of the relay lens 403. Further, in some embodiments, three or more relay lenses, including a relay lens movable in the directions parallel to the optical axis L of the relay lens 403 and a relay lens movable in the directions perpendicular to the optical axis L of the relay lens 403, may be included in the illumination optical system unit 40, for example.

Although an illumination optical system, an optical engine, and an image projection apparatus of the present invention have been described above with respect to illustrative embodiments, the present invention is not limited to these embodiments, and numerous variations and modifications may be made without departing from the scope of the present invention.

What is claimed is:

1. An illumination optical system configured to guide light emitted from a light source to an image generation unit that is arranged to be movable in a direction perpendicular to incoming light and is configured to generate an image by reflecting the incoming light, the illumination optical system comprising:
   a first lens that is arranged to be movable in a direction perpendicular to an optical axis of the first lens;
   a second lens that is arranged to be movable in a direction that changes a face-to-face distance between the first lens and the second lens; and
   a lens position control unit configured to displace the first lens and the second lens.

2. The illumination optical system according to claim 1, wherein
   the lens position control unit is configured to displace the first lens and the second lens based on a position of the image generation unit.

3. The illumination optical system according to claim 1, wherein
   the first lens is arranged to be movable in two directions that are orthogonal to each other and perpendicular to the optical axis of the first lens.

4. An optical engine comprising:

the illumination optical system according to claim 1;
the light source; and
the image generation unit.

5. The optical engine according to claim 4, further comprising:
- a movement control unit configured to move a digital micromirror device, which includes a plurality of micromirrors arranged into an array, at a predetermined cycle by a distance less than an array interval of the plurality of micromirrors; and
- an image control unit configured to generate an image signal according to a position of the digital mircromirror device;
- wherein the image generation unit is the digital micromirror device that is configured to modulate an incoming light beam guided by the illumination optical system based on the image signal.

6. An image projection apparatus comprising:
the optical engine according to claim 4; and
a projection unit configured to project the image generated by the image generation unit.

* * * * *